(12) United States Patent
Martin et al.

(10) Patent No.: US 11,473,650 B2
(45) Date of Patent: Oct. 18, 2022

(54) METHOD OF OPERATING A SHIFTING SYSTEM FOR A VEHICLE TRANSMISSION

(71) Applicant: BorgWarner Inc., Auburn Hills, MI (US)

(72) Inventors: R. Keith Martin, Marlette, MI (US); Xinqian Xiang, Clawson, MI (US)

(73) Assignee: BorgWarner Inc., Auburn Hills, MI (US)

( * ) Notice: Subject to any disclaimer, the term of this patent is extended or adjusted under 35 U.S.C. 154(b) by 47 days.

(21) Appl. No.: 17/116,263

(22) Filed: Dec. 9, 2020

(65) Prior Publication Data

US 2021/0172501 A1 Jun. 10, 2021

Related U.S. Application Data

(60) Provisional application No. 63/091,794, filed on Oct. 14, 2020, provisional application No. 62/946,156, filed on Dec. 10, 2019.

(51) Int. Cl.
*F16H 3/00* (2006.01)
*F16H 61/688* (2006.01)

(52) U.S. Cl.
CPC ........... *F16H 3/006* (2013.01); *F16H 61/688* (2013.01); *F16H 2708/16* (2013.01)

(58) Field of Classification Search
CPC ..... F16H 3/006; F16H 61/688; F16H 2708/16
(Continued)

(56) References Cited

U.S. PATENT DOCUMENTS 9,151,345 B2 10/2015 Showalter
9,726,236 B2 8/2017 Papania
(Continued)

FOREIGN PATENT DOCUMENTS

DE 10 2019 003 004 A1 10/2020
DE 102019003004 A1 10/2020
(Continued)

OTHER PUBLICATIONS

Machine-assisted English language abstract and machine-assisted English language translation for DE 10 2019 003 004 A1 extracted from espacenet.com database on Aug. 9, 2021, 16 pages.
(Continued)

*Primary Examiner* — Ha Dinh Ho
(74) *Attorney, Agent, or Firm* — Howard & Howard Attorneys PLLC

(57) ABSTRACT

A method of operating a shifting system for a vehicle transmission includes engaging a clutch to operatively couple one of first and second gear ratios to an input member, and moving a disconnect from a first disconnect position where a disconnectable component is disengaged from the disconnect, to a second disconnect position where the disconnectable component is engaged with the disconnect to operatively couple the other of the first and second gear ratios to the input member through a shifting assembly. Engaging the clutch and moving the disconnect are performed such that the clutch is operatively coupled to one of the first and second gear ratios at the same time that the shifting assembly is operatively coupled to the other one of (Continued)

the first and second gear ratios, thus preventing torque from being transmitted through either the first and second gear ratios of the vehicle transmission to park the vehicle.

19 Claims, 18 Drawing Sheets

(58) Field of Classification Search
USPC .................................................. 74/330, 331
See application file for complete search history.

(56) References Cited

U.S. PATENT DOCUMENTS

| | | |
|---|---|---|
| 9,797,458 B2 | 10/2017 | Damm et al. |
| 9,939,027 B2 | 4/2018 | Damm et al. |
| 10,151,359 B2 | 12/2018 | Campton |
| 11,215,242 B2 * | 1/2022 | Campton ............... F16D 41/082 |
| 2011/0155530 A1 | 6/2011 | Vierk et al. |
| 2014/0033844 A1 * | 2/2014 | Rothvoss .................. F16H 3/16 74/335 |
| 2014/0318918 A1 | 10/2014 | Mordukhovich |
| 2018/0112725 A1 | 4/2018 | Campton et al. |
| 2018/0126839 A1 | 5/2018 | Park |
| 2018/0335110 A1 * | 11/2018 | Yang .......................... F16H 3/10 |
| 2019/0301576 A1 * | 10/2019 | Harada ............... F16H 37/0813 |
| 2019/0351762 A1 * | 11/2019 | Yang ..................... F16H 57/037 |
| 2020/0309201 A1 * | 10/2020 | Genesius ................ F16D 25/08 |
| 2020/0347916 A1 * | 11/2020 | Sung ...................... B60W 10/10 |
| 2021/0164543 A1 | 6/2021 | Yang et al. |

FOREIGN PATENT DOCUMENTS

| | | |
|---|---|---|
| FR | 2 604 228 A1 | 3/1988 |
| FR | 2604228 A1 | 3/1988 |

OTHER PUBLICATIONS

Back, Ottmar, "Basics of Synchronizers", Hoerbiger, Jan. 2013, 78 pages.
Echtler, Peter et al., "Presentation: Alternative Schaltelemente—E-Drive+ Concept with TorqueLINE Twin Cone and TorqueLINE Disconnect Clutch", 16th International CTI Symposium, Berlin, Hoerbiger Antriebstechnik Holding GmbH, Dec. 2017, 28 pages.
Echtler, Peter et al., "Innovative Shift Elements For Power-Shiftable Two-Speed Electric Axle With Torque factoring Function", Horerbiger Antriebstechnik Holding GmbH, Germany, 2018, 13 pages.
United States Non-Provisional U.S. Appl. No. 17/112,181, filed Dec. 4, 2020.
United States Non-Provisional U.S. Appl. No. 17/116,209, filed Dec. 9, 2020.
United States Non-Provisional U.S. Appl. No. 17/116,239, filed Dec. 9, 2020.
English language abstract and machine-assisted English language translation for FR 2 604 228 A1 extracted from espacenet.com database on Sep. 29, 2021, 9 pages.

* cited by examiner

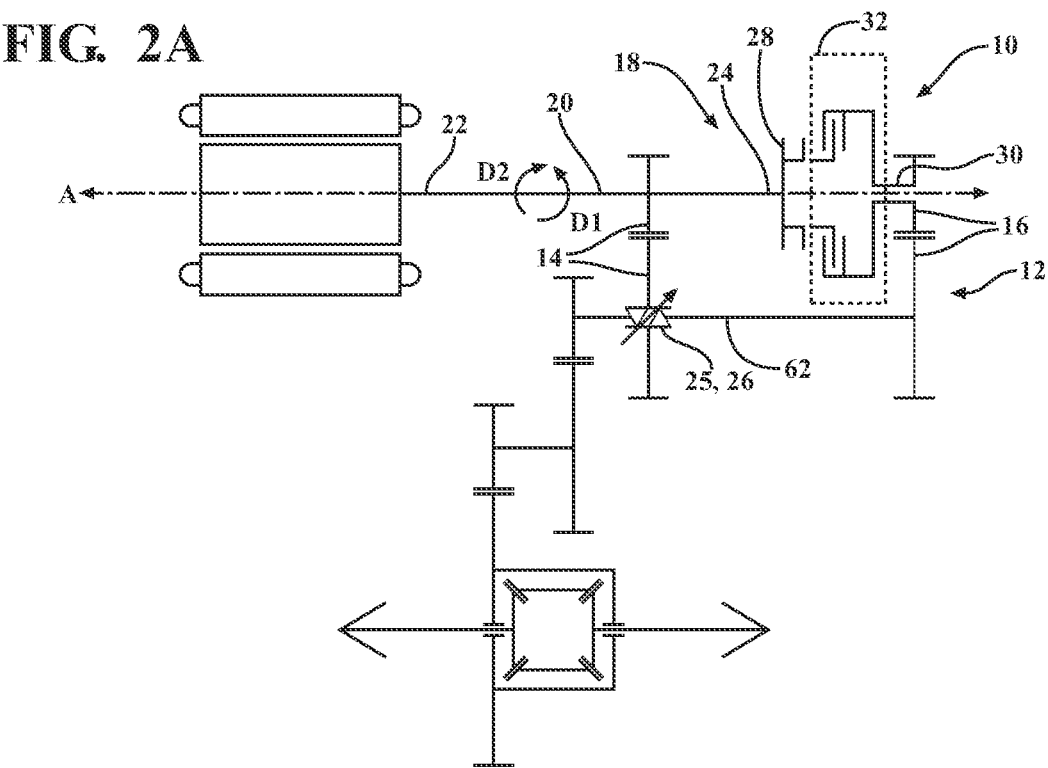
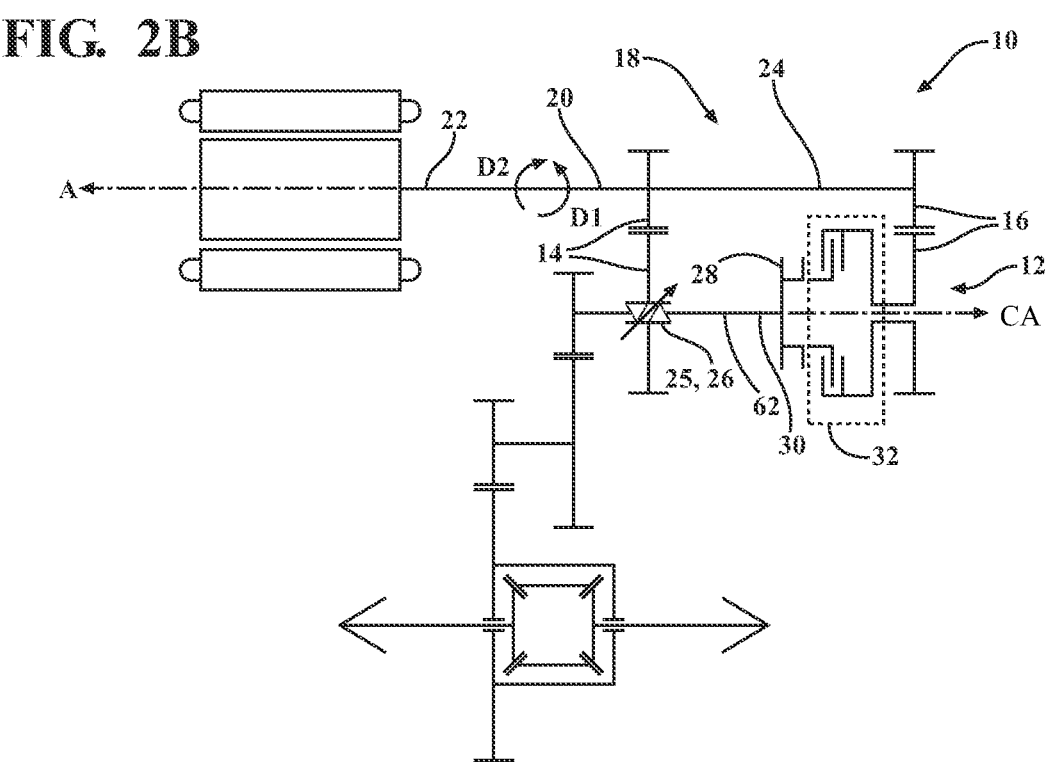

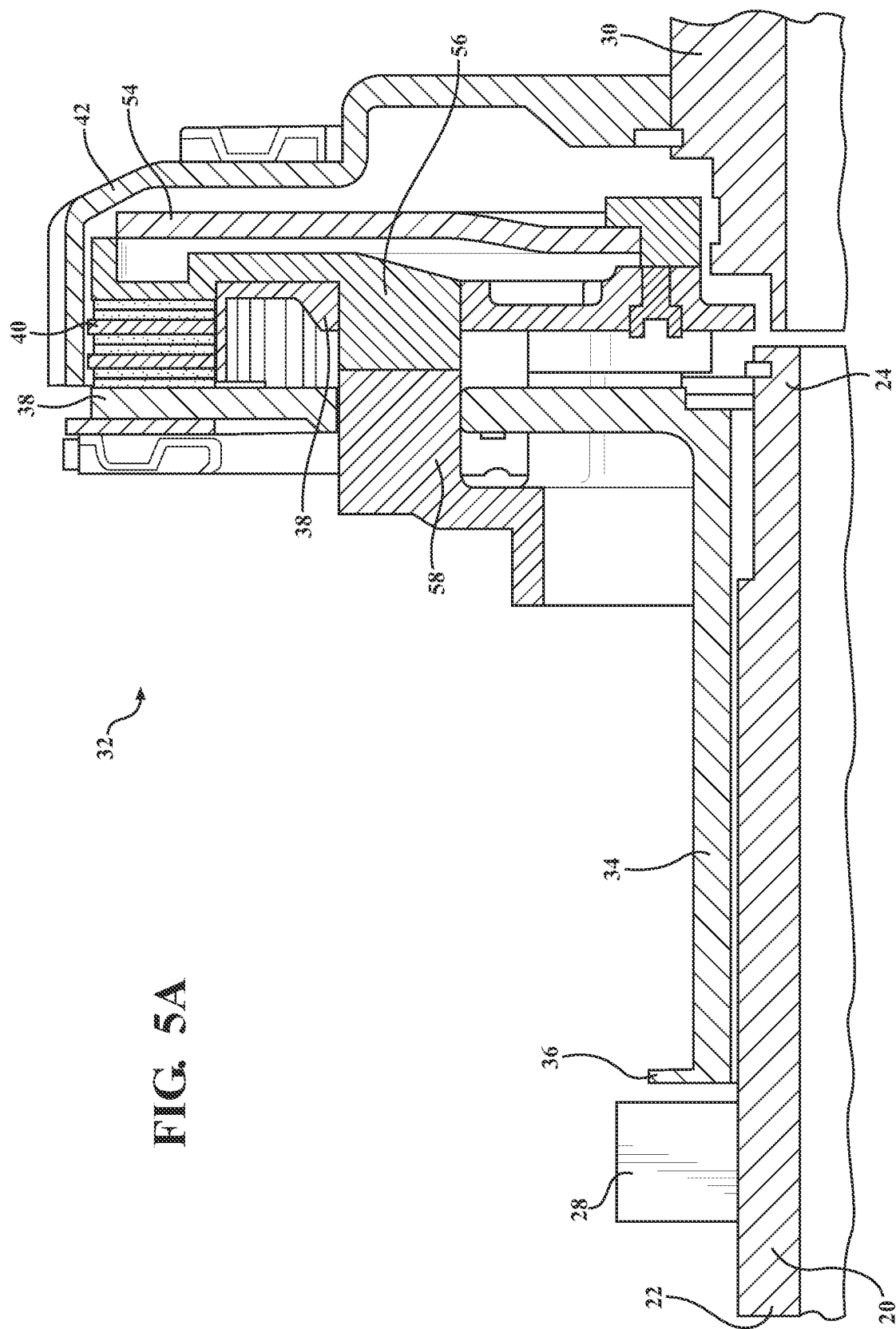

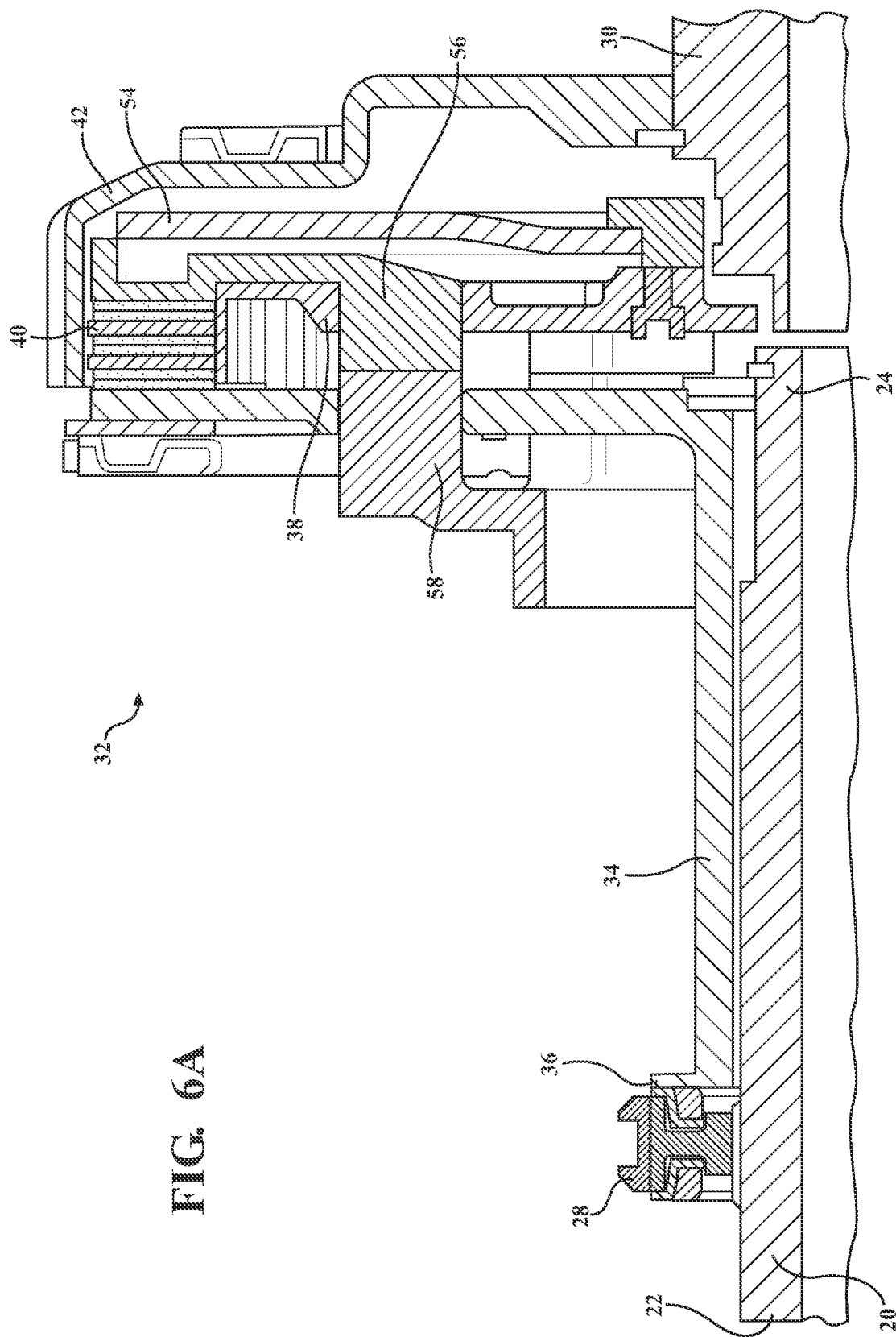

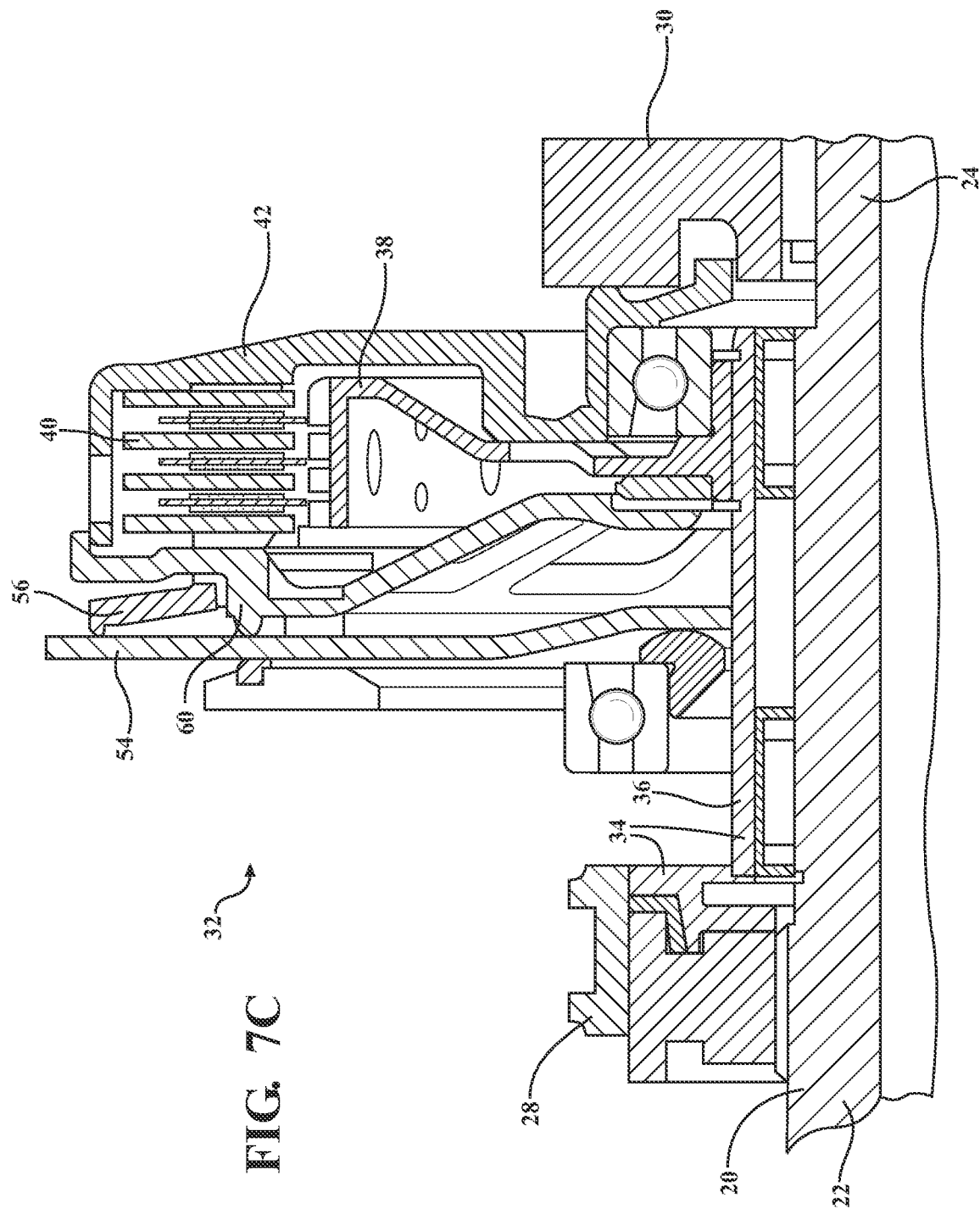

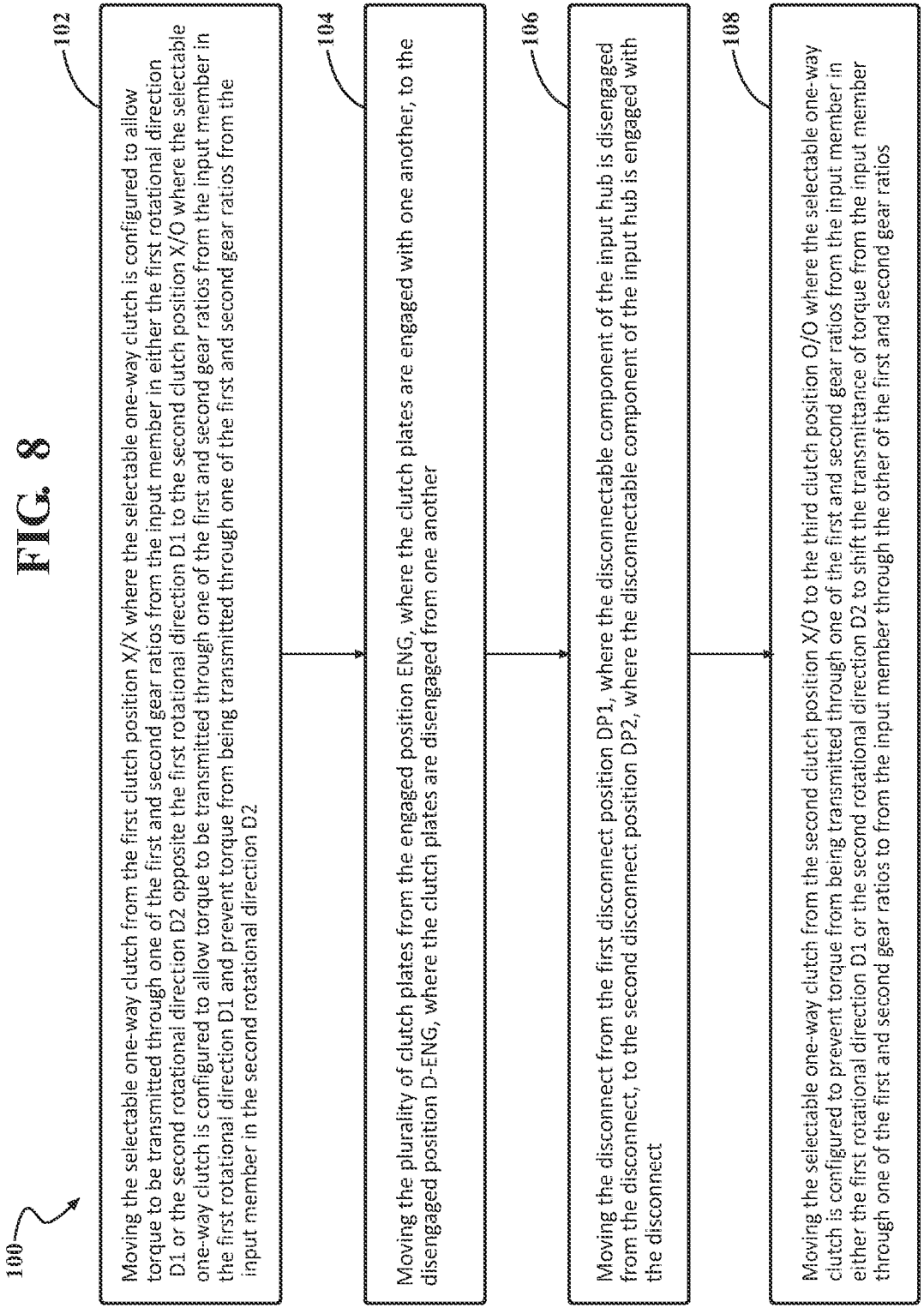

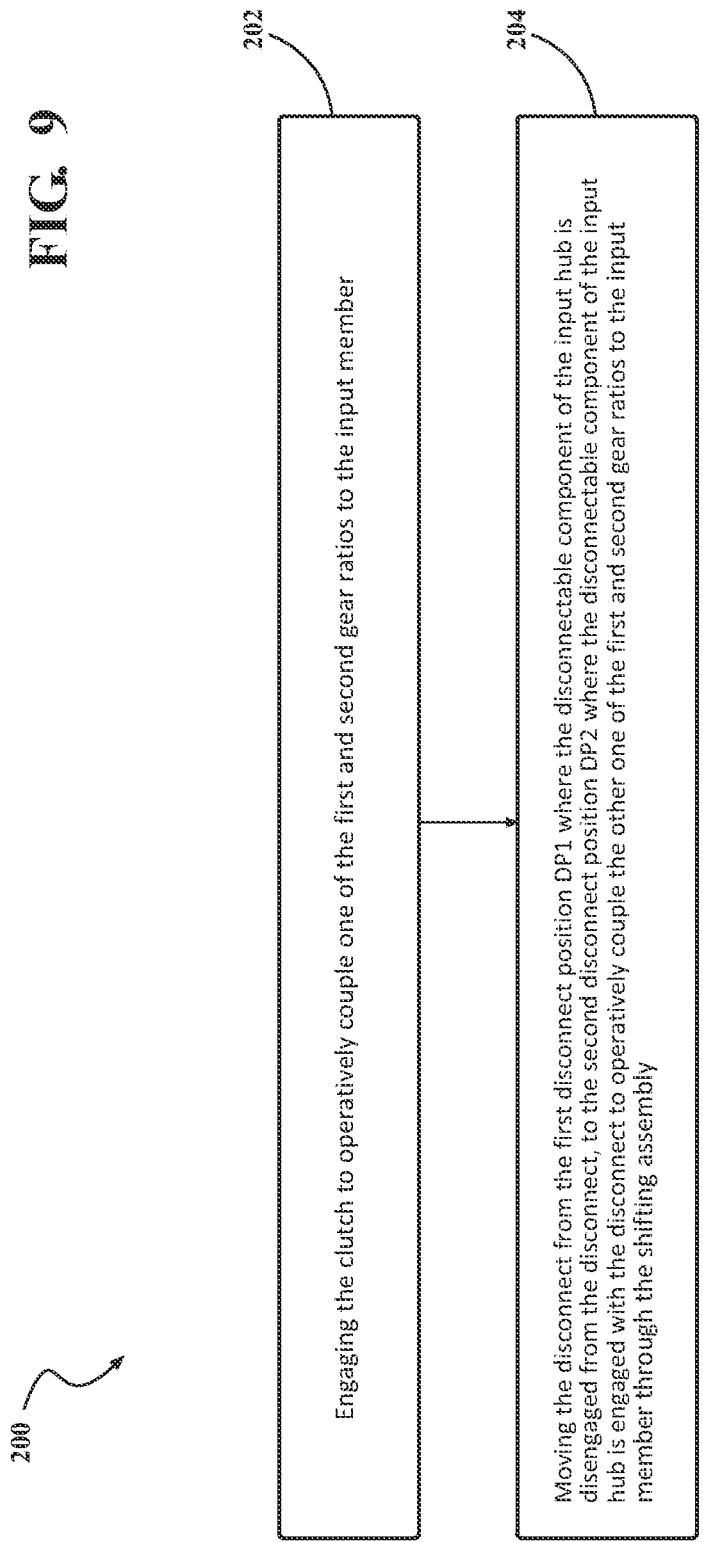

METHOD OF OPERATING A SHIFTING SYSTEM FOR A VEHICLE TRANSMISSION

CROSS-REFERENCE TO RELATED APPLICATIONS

The present application claims priority to and all the benefits of U.S. Provisional Patent Application Nos. 62/946,156 filed on Dec. 10, 2019, and 63/091,794 filed on Oct. 14, 2020, which are expressly incorporated herein by reference in their entirety.

BACKGROUND OF THE INVENTION

1. Field of the Invention

The present invention generally relates to a method of operating a shifting system for a vehicle transmission.

2. Description of the Related Art

Conventional vehicles known in the art typically include a motor having a rotational output as a rotational input into a vehicle transmission. The motor is typically an internal combustion engine or an electric motor, and generates the rotational output which is selectively transferred to the vehicle transmission which, in turn, transfers rotational torque to one or more wheels of the vehicle. The vehicle transmission changes the rotational speed and torque generated by the motor through a series of predetermined gearsets, whereby changing between the gearsets enables the vehicle to travel at different vehicle speeds for a given motor speed. Commonly, the motor is the electric motor coupled to the vehicle transmission in an axle connected to the wheels of the vehicle.

Rotational input into the vehicle transmission typically requires a shifting system to selectively transfer torque to the components of the vehicle transmission. A typical shifting system includes an input member (e.g. the rotational output from the motor) rotatable about an axis, a disconnect coupled to the input member, and an output member (e.g. the rotational input to the vehicle transmission) selectively rotatable with the input member about the axis. A shifting assembly is also typically required to selectively rotatably couple the input member and the output member.

The shifting systems known in the art often suffer from in high drag losses, which lowers the efficiency of torque transfer between the motor and the vehicle transmission. Additionally, typical shifting systems produce rough engagement between the motor and the components of the vehicle transmission through connection with the disconnect, resulting in vibrations of the vehicle and an uncomfortable driving experience.

Accordingly, it is desirable to provide an improved shifting system for vehicle transmissions.

SUMMARY OF THE INVENTION AND ADVANTAGES

A shifting system for a vehicle transmission includes an input member extending along an axis between a first end and a second end spaced from the first end. The vehicle transmission has a gearset including a first gear ratio and a second gear ratio different from the first gear ratio. The input member is rotatable about the axis. The shifting system further includes a clutch is coupled to the input member. The clutch is configured to selectively allow torque to be transmitted through one of the first and second gear ratios of the gearset from the input member.

The shifting system also includes a disconnect coupled to the input member. The disconnect is movable between a first disconnect position and a second disconnect position. An output member is spaced from the input member, and the output member is selectively rotatable with the input member about the axis to selectively transmit torque through the other of the first and second gear ratios of the gearset.

The shifting system further includes a shifting assembly for selectively rotatably coupling the input member and the output member. The shifting assembly includes an input hub coupled to the input member. The input hub has a disconnectable component engageable with the disconnect, and the disconnectable component of the input hub is disengaged from the disconnect when the disconnect is in the first disconnect position and the disconnectable component of the input hub is engaged with the disconnect when the disconnect is in the second disconnect position.

The input hub has a clutch engagement component. The shifting assembly also includes a plurality of clutch plates is coupled to the clutch engagement component of the input hub. The plurality of clutch plates is movable between an engaged position and a disengaged position. In the engaged position, the clutch plates are engaged with one another. In the disengaged position, the clutch plates are disengaged from one another. The shifting assembly further includes a clutch plate carrier is coupled to the plurality of clutch plates and to the output member to transmit torque from the clutch engagement component of the input hub, through the plurality of clutch plates and the clutch plate carrier, to the output member.

Accordingly, the shifting system results in low drag losses, which increases the efficiency of torque transfer between a motor and the vehicle transmission. Moreover, the shifting system produces smooth engagement between the motor and the vehicle transmission through the shifting assembly (i.e., through the connection with the disconnect and engagement of the plurality of clutch plates), resulting in fewer vibrations and a more comfortable driving experience. Furthermore, the clutch allows the shifting system to achieve low spin losses by rotatably decoupling the shifting assembly when torque is not required to be transmitted through the shifting assembly. The low spin losses allowed by the combination of the clutch and the shifting assembly allow the first and second gear ratios of the vehicle transmission to achieve a net energy savings as compared to a single speed transmission.

Additionally, a method of operating the shifting system for the vehicle transmission includes the step of engaging the clutch to operatively couple one of the first and second gear ratios to the input member. The method also includes the step of moving the disconnect from the first disconnect position where the disconnectable component of the input hub is disengaged from the disconnect, to the second disconnect position where the disconnectable component of the input hub is engaged with the disconnect to operatively couple the other one of the first and second gear ratios to the input member through the shifting assembly.

The steps of engaging the clutch and moving the disconnect from the first disconnect position to the second disconnect position are performed such that the clutch is operatively coupled to one of the first and second gear ratios at the same time that the shifting assembly is operatively coupled to the other one of the first and second gear ratios, thus preventing torque from being transmitted through either the first and second gear ratios of the vehicle transmission to park the vehicle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2A is a schematic illustration of the vehicle transmission with the clutch rotatably coupled to and disposed about the countershaft and the shifting assembly coupled to the input member FIG. 2B is a schematic illustration of the vehicle transmission, with the selectable one-way clutch rotatably coupled to and disposed about the countershaft and the shifting assembly coupled to the countershaft;

FIG. 5A is a cross-section view of the shifting assembly having an apply plate and a plurality of clutch plates, with the disconnect in the first disconnect position where the disconnect is disengaged with an input hub of the shifting assembly, and the apply plate is in the first plate position where the plurality of clutch plates are in the engaged position;

FIG. 6A is a cross-section view of the shifting assembly, with the disconnect being a synchronizer, and with the disconnect in the first disconnect position where the disconnect is disengaged with an input hub, and the apply plate is in the first plate position where the plurality of clutch plates are in the engaged position;

FIG. 7C is a cross-sectional view of the shifting assembly, with the disconnect in the second disconnect position where the disconnect is engaged with the input hub, and the apply plate is in the second plate position where the plurality of clutch plates are in the disengaged position;

FIG. 8 is a flowchart of a method of operating the shifting system, with the method directed toward shifting transmittance of torque between the first and second gear ratios; and FIG. 9 is a flowchart of a method of operating the shifting system, with the method directed toward parking the vehicle.

DETAILED DESCRIPTION OF THE INVENTION

Figure 1A:
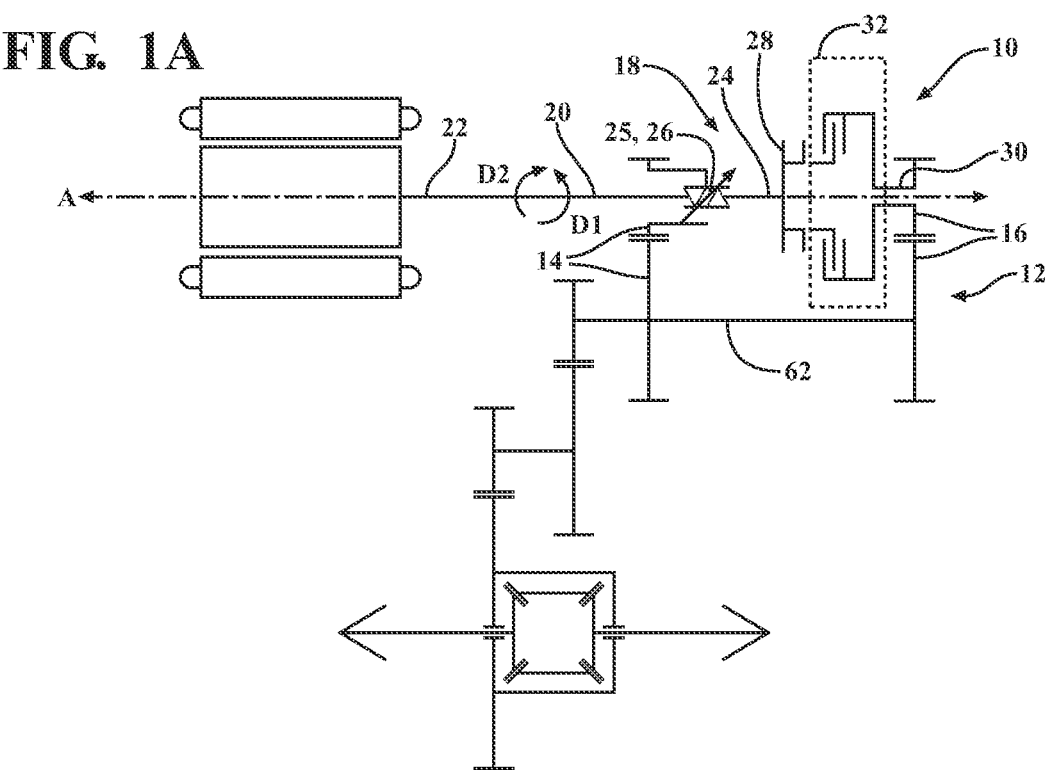
FIG. 1A is a schematic illustration of a vehicle transmission for a vehicle, the vehicle transmission including a shifting system having an electric motor, an input member, a clutch rotatably coupled to and disposed about the input member for selectively transmitting torque through a first gear ratio, and a shifting assembly coupled to the input member for selectively transmitting torque through a second gear ratio.
Figure 1B:
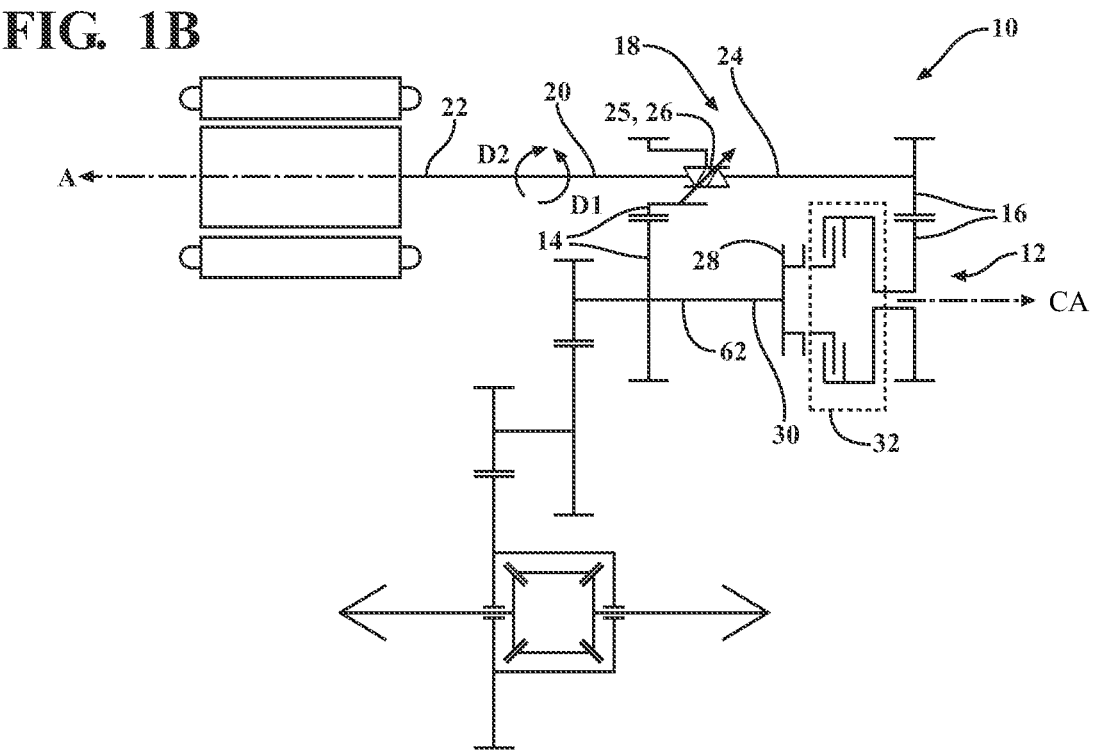
FIG. 1B is a schematic illustration of the vehicle transmission including a countershaft, with the selectable one-way clutch rotatably coupled to the input member and the shifting assembly coupled to the countershaft.

With reference to the Figures, wherein like numerals indicate like parts throughout the several views, a vehicle transmission 10 is provided in schematic illustration in FIGS. 1A-1B. The vehicle transmission 10 has a gearset 12 including a first gear ratio 14 and a second gear ratio 16 different from the first gear ratio 14. A shifting system 18 for the vehicle transmission 10 is shown in FIGS. 1A-2B.

The shifting system 18 includes an input member 20 extending along an axis A between a first end 22 and a second end 24 spaced from the first end 22. The input member 20 is rotatable about the axis A. As non-limiting examples, the input member 20 may be a shaft or a gear. The shifting system 18 also includes a clutch 25 coupled to the input member 20. The clutch 25 is configured to selectively allow torque to be transmitted through one of the first and second gear ratios 14, 16 of the gearset 12 from the input member 20. The clutch 25 may be a variety of clutch types and configurations, which are detailed further below. Notably, although not required, the clutch 25 may be a selectable one-way clutch 26. The selectable one-way clutch 26 is rotatably coupled to the input member 20, and the selectable one-way clutch 26 is movable between a first clutch position (denoted as X/X in FIG. 3), a second clutch position (denoted as X/O in FIG. 3), and a third clutch position (denoted as O/O in FIG. 3).

Figure 3:
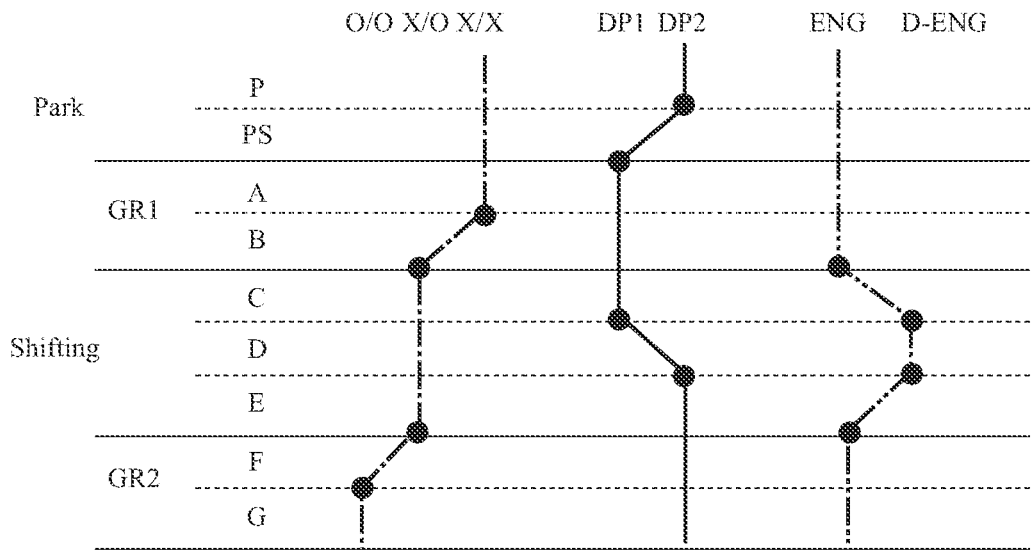
FIG. 3 is a schematic illustration of a shifting schedule for the shifting system of the vehicle transmission, with X/X denoting a first clutch position, X/O denoting a second clutch position, O/O denoting a third clutch position, O/X denoting a fourth clutch position, DP1 denoting a first disconnect position, DP2 denoting a second disconnect position, ENG denoting an engaged position of the clutch plates of the shifting assembly, and D-ENG denoting a disengaged position of the clutch plates.

In the first clutch position X/X, as shown in FIG. 3, the selectable one-way clutch 26 is configured to allow torque to be transmitted through one of the first and second gear ratios 14, 16 of the gearset 12 from the input member 20 in either a first rotational direction D1 or a second rotational direction D2 opposite the first rotational direction. In the first clutch position X/X, the selectable one-way clutch 26 is in a lock/lock configuration. In this lock/lock configuration, torque may be transmitted from the input member 20 through one of the first and second gear ratios 14, 16 in the first rotational direction D1. It is also to be appreciated that torque may be transmitted through one of the first and second gear ratios 14, 16 to the input member 20 in the second rotational direction D2. In other words, in the first clutch position X/X, torque may be transmitted in either the first rotational direction D1, or the second rotational direction D2. It is to be appreciated that the first rotational direction D1 may be clockwise, and the second rotational direction D2 may be counterclockwise. Alternatively, it is to be appreciated that the first rotational direction D1 may be counterclockwise, and the second rotational direction D2 may be clockwise.

In the second clutch position X/O, as shown in FIG. 3, the selectable one-way clutch 26 is configured to allow torque to be transmitted through one of the first and second gear ratios 14, 16 of the gearset 12 from the input member 20 in the first rotational direction D1 and prevent torque from being transmitted through one of the first and second gear ratios 14, 16 of the gearset 12 from the input member 20 in the second rotational direction D2. In the second clutch position X/O, the selectable one-way clutch 26 is in a lock/free configuration. In this lock/free configuration, torque may be transmitted from the input member 20 through one of the first and second gear ratios 14, 16 in the first rotational direction D1. However, torque is prevented from being transmitted through one of the first and second gear ratios 14, 16 to the input member 20 in the second rotational direction D2. This lock/free configuration is typically referred to as overrunning the selectable one-way clutch 26 and assists in shifting transmittance of torque from either through the first gear ratio 14 to the second gear ratio 16, or through the second gear ratio 16 to the first gear ratio 14. The second clutch position X/O, therefore, may be referred to as shift ready.

In the third clutch position O/O, as shown in FIG. 3, the selectable one-way clutch 26 is configured to prevent torque from being transmitted through one of the first and second gear ratios 14, 16 of the gearset 12 from the input member 20 in either the first rotational direction D1 or the second rotational direction D2. In the third clutch position O/O, the selectable one-way clutch 26 is in a free/free configuration. In this free/free configuration, torque is prevented from being transmitted from the input member 20 through one of the first and second gear ratios 14, 16 in the first rotational direction D1. In this free/free configuration, torque is also prevented from being transmitted through one of the first and second gear ratios 14, 16 to the input member 20 in the second rotational direction D2. The free/free configuration limits drag losses on the shifting system 18 by rotatably decoupling one of the first and second gear ratios 14, 16 from the input member 20.

The shifting system 18 also includes a disconnect 28 coupled to the input member 20. The disconnect 28 is movable between a first disconnect position DP1, as shown in FIGS. 3, 5A, 5B, 6A, 6B, 7A, and 7B, and a second disconnect position DP2, as shown in FIGS. 3, 5C, 5D, 6C, 6D, 7C, and 7D. The shifting system 18 also includes an output member 30 is spaced from the input member 20, and the output member 30 is selectively rotatable with the input member 20 about the axis A to selectively transmit torque through the other of the first and second gear ratios 14, 16 of the gearset 12.

The shifting system 18 further includes a shifting assembly 32 for selectively rotatably coupling the input member 20 and the output member 30. The shifting assembly 32 includes an input hub 34 coupled to the input member 20. The input hub 34 has a disconnectable component 36 engageable with the disconnect 28, and the disconnectable component 36 of the input hub 34 is disengaged from the disconnect 28 when the disconnect 28 is in the first disconnect position DP1 and the disconnectable component 36 of the input hub 34 is engaged with the disconnect 28 when the disconnect 28 is in the second disconnect position DP2.

The disconnect 28 rotatably disconnects the input member 20 and the disconnectable component 36, thus rotatably disconnecting the input member 20 and the input hub 34. In one embodiment, the disconnect 28 is a disconnect clutch. Alternatively, in another embodiment, the disconnect 28 is a synchronizer. In the embodiments where the disconnect 28 is a synchronizer, the synchronizer may have a synchronizer ring, a synchronizer cone, a synchronizer hub, and a synchronizer sleeve. In yet another embodiment, the disconnect 28 is a dog clutch.

The input hub 34 has a clutch engagement component 38. The shifting assembly 32 includes a plurality of clutch plates 40 coupled to the clutch engagement component 38 of the input hub 34. The plurality of clutch plates 40 is movable between an engaged position ENG and a disengaged position D-ENG. In the engaged position ENG, as shown in FIGS. 3, 5A, 5D, 6A, 6D, 7A, and 7D, the clutch plates 40 are engaged with one another. In the disengaged position D-ENG, as shown in FIGS. 3, 5B, 5C, 6B, 6C, 7B, and 7C, the clutch plates 40 are disengaged from one another. The shifting assembly 32 also includes a clutch plate carrier 42 is coupled to the plurality of clutch plates 40 and to the output member 30 to transmit torque from the clutch engagement component 42 of the input hub 34, through the plurality of clutch plates 40 and the clutch plate carrier 42, to the output member 30.

The shifting system 18 results in low drag losses, which increases the efficiency of torque transfer between a motor and the vehicle transmission 10. Moreover, the shifting system 18 produces smooth engagement between the motor and the vehicle transmission 10 through the shifting assembly 32 (i.e., through the connection with the disconnect 28 and engagement of the plurality of clutch plates 40), resulting in fewer vibrations and a more comfortable driving experience. Furthermore, the clutch 26 allows the shifting system 18 to achieve low spin losses by rotatably decoupling the shifting assembly 32 when torque is not required to be transmitted through the shifting assembly 32. The low spin losses allowed by the combination of the clutch 26 and the shifting assembly 32 allow the first and second gear ratios 14, 16 of the vehicle transmission 10 to achieve a net energy savings as compared to a single speed transmission.

As discussed above, it is to be appreciated that the clutch 25 may be a variety of clutch types and configurations. In a non-limiting example, the clutch 25 may be the selectable one-way clutch 26. However, in other non-limiting examples, the clutch 25 may be another shifting assembly as described herein, may be a dry friction clutch, may be a wet friction clutch, may be a single plate clutch, may be a multi-plate clutch, may be a cone clutch, may be a dog clutch, or may be a centrifugal clutch.

It is to be appreciated that the motor may be an internal combustion motor or may be an electric motor. It is also to be appreciated that the motor may be coupled to a back axle of the vehicle. In one embodiment, the motor is the electric motor and is rotatably coupled to the back axle of the vehicle and configured to rotate the back axle of the vehicle to propel the vehicle.

Figure 4A:
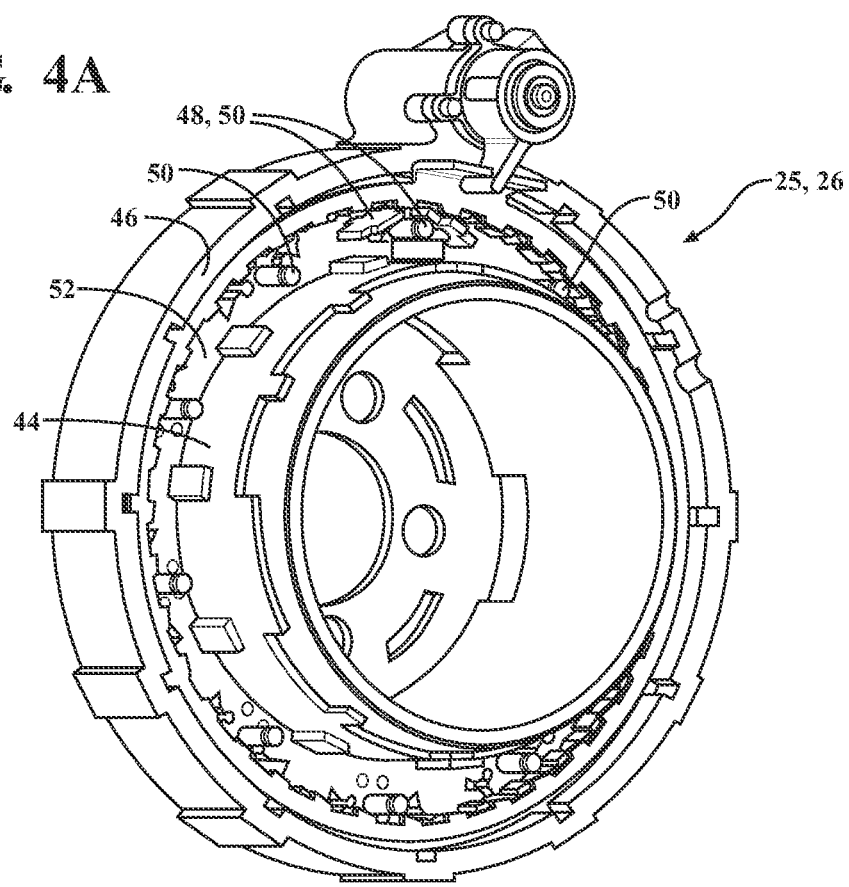
FIG. 4A is a perspective view of a selectable one-way clutch, with the selectable one-way clutch being of the stationary variety and with the selectable one-way clutch having an inner race, an outer race, a plurality of pawls circumferentially spaced from one another, and an actuator ring coupled to the pawls.
Figure 4B:
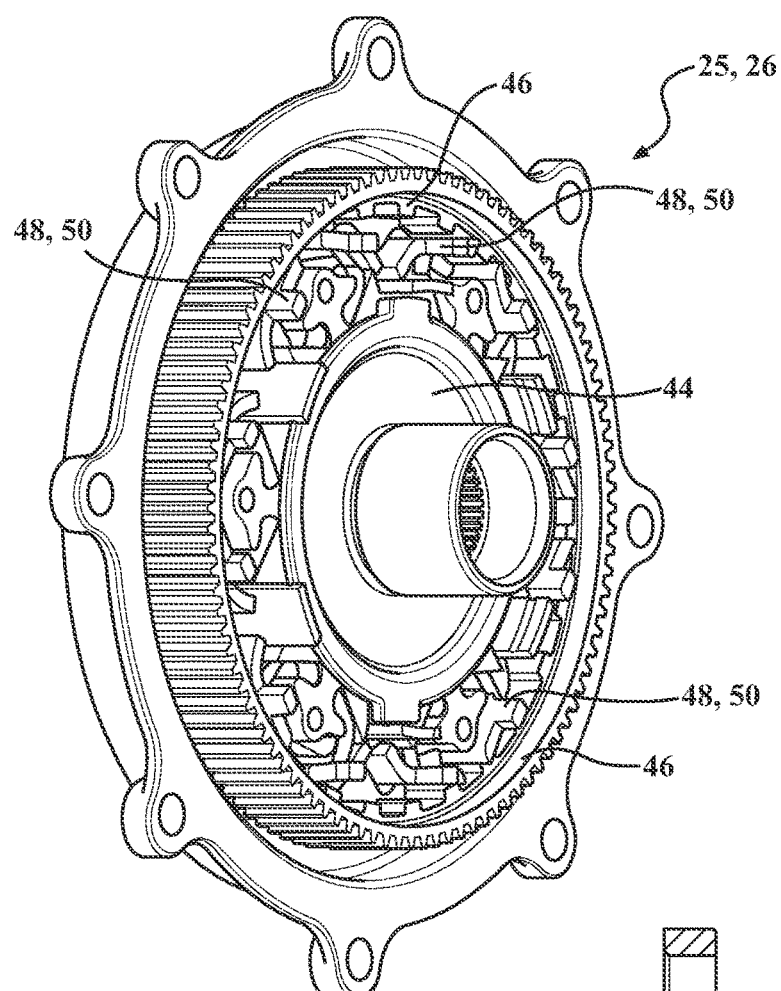
FIG. 4B is a perspective view of the selectable one-way clutch, with the selectable one-way clutch being of the rotating variety.
Figure 4C:
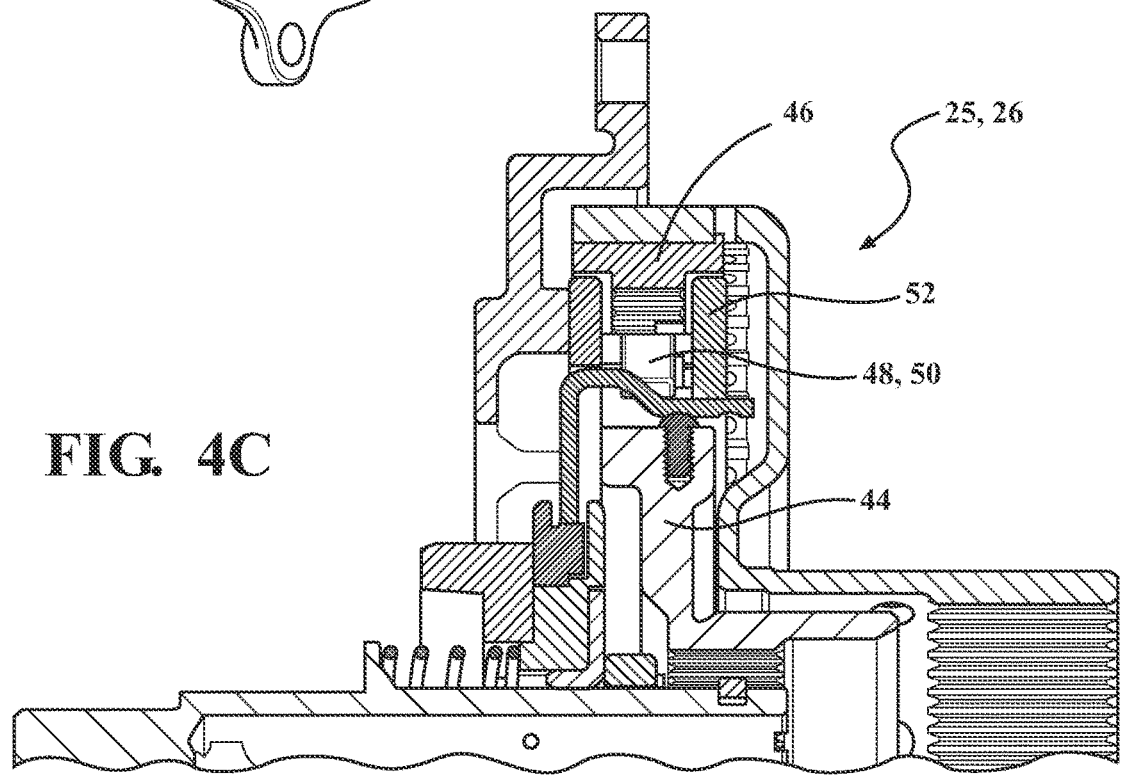
FIG. 4C is a cross-sectional view of the selectable one-way clutch of FIG. 4B.
Figure 5B:
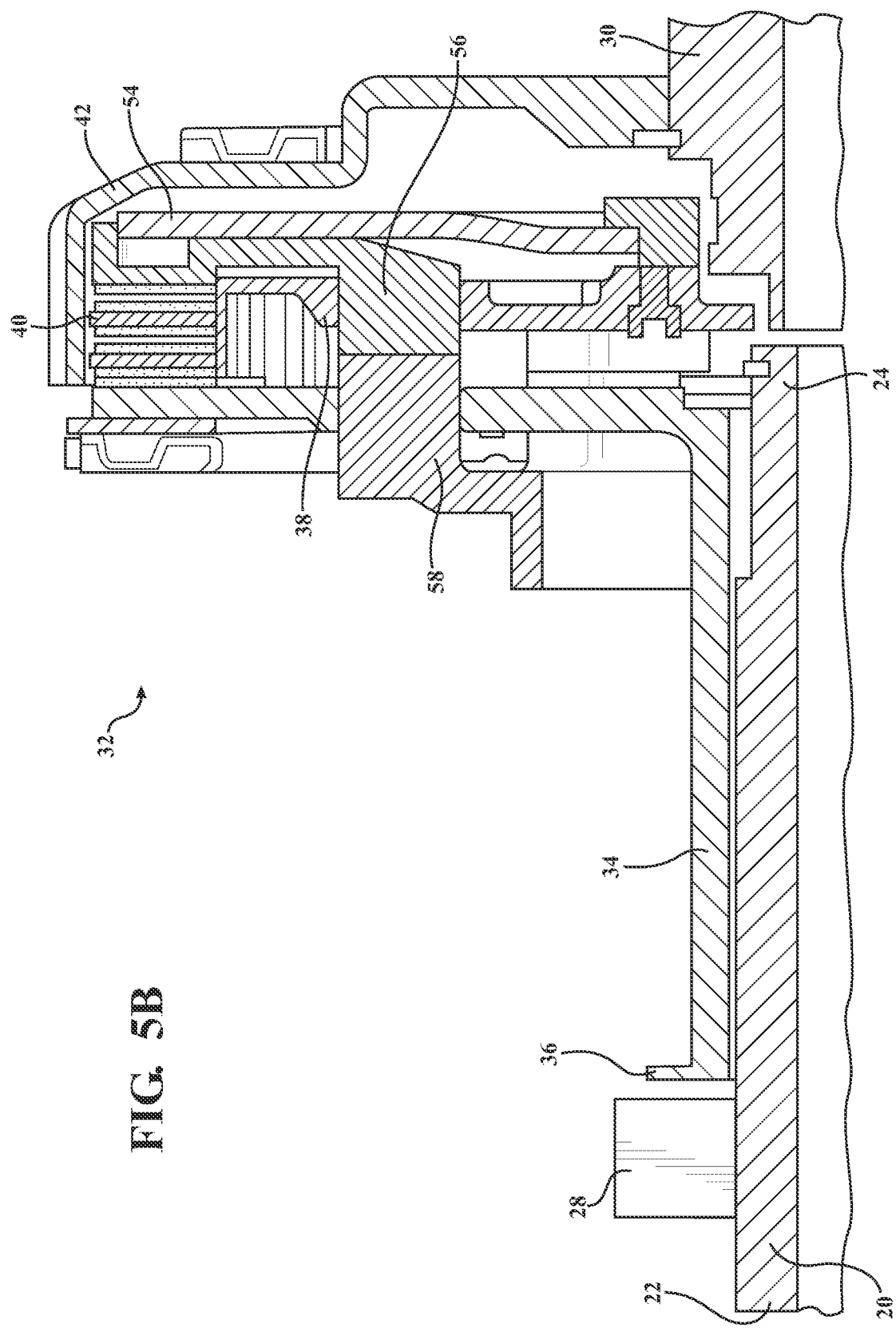
FIG. 5B is a cross-section view of the shifting assembly, with the disconnect in the first disconnect position where the disconnect is disengaged with the input hub, and the apply plate is in the second plate position where the plurality of clutch plates are in the disengaged position.
Figure 5C:
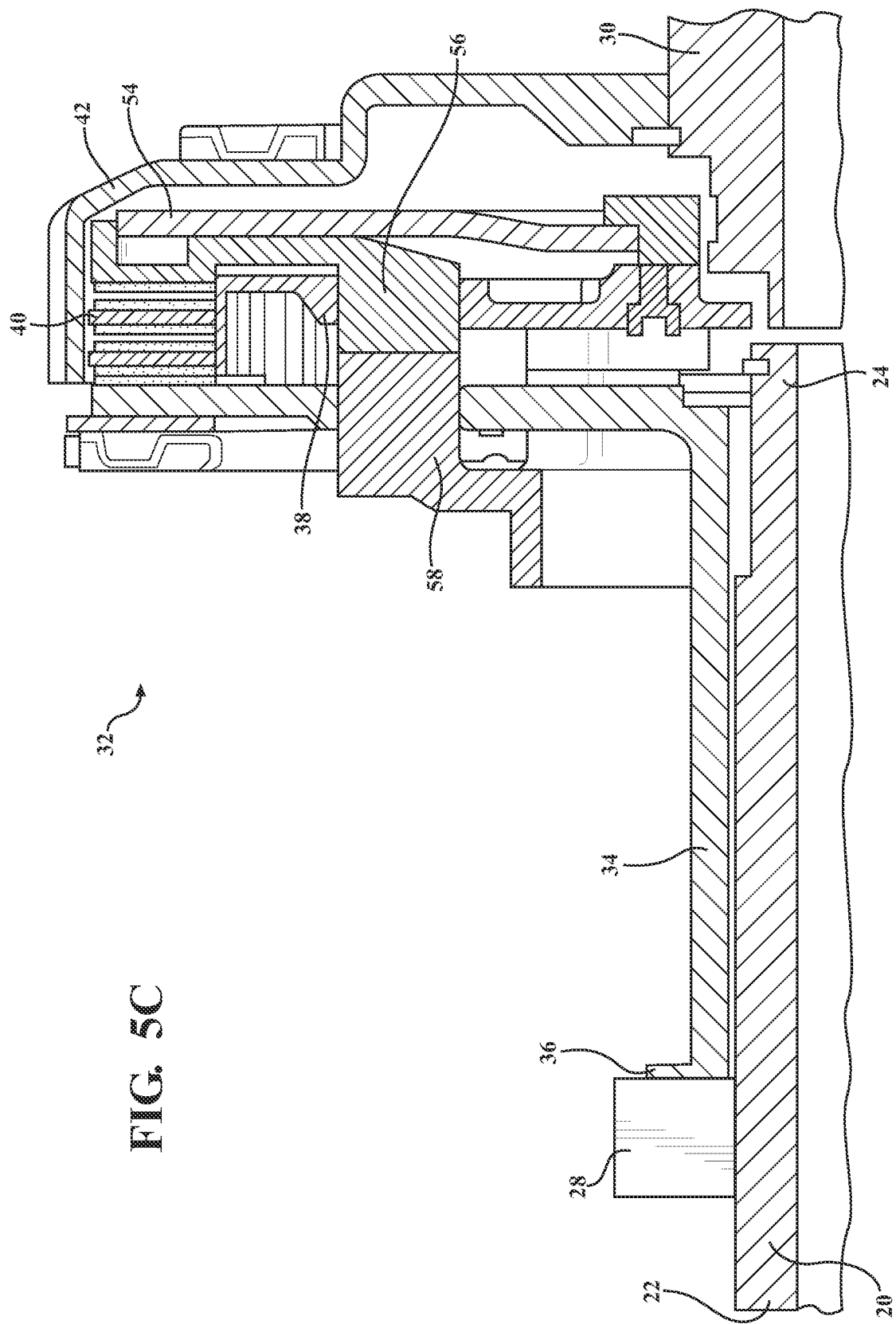
FIG. 5C is cross-sectional view of the shifting assembly, with the disconnect in the second disconnect position where the disconnect is engaged with the input hub, and the apply plate is in the second plate position where the plurality of clutch plates are in the disengaged position.
Figure 5D:
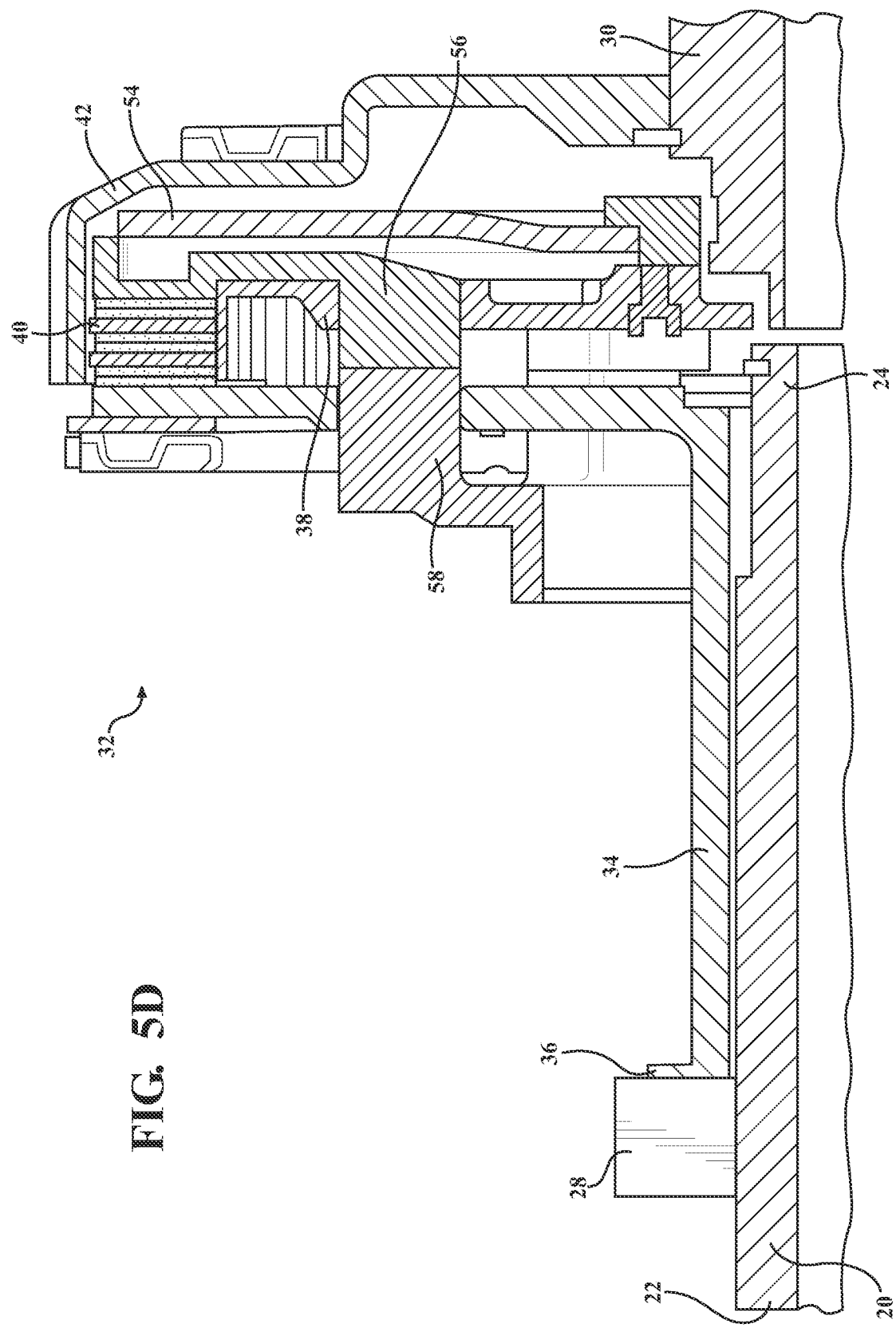
FIG. 5D is a cross-sectional view of the shifting assembly, with the disconnect in the second disconnect position where the disconnect is engaged with the input hub, and the apply plate is in the first disconnect position where the plurality of clutch plates are in the engaged position.
Figure 6B:
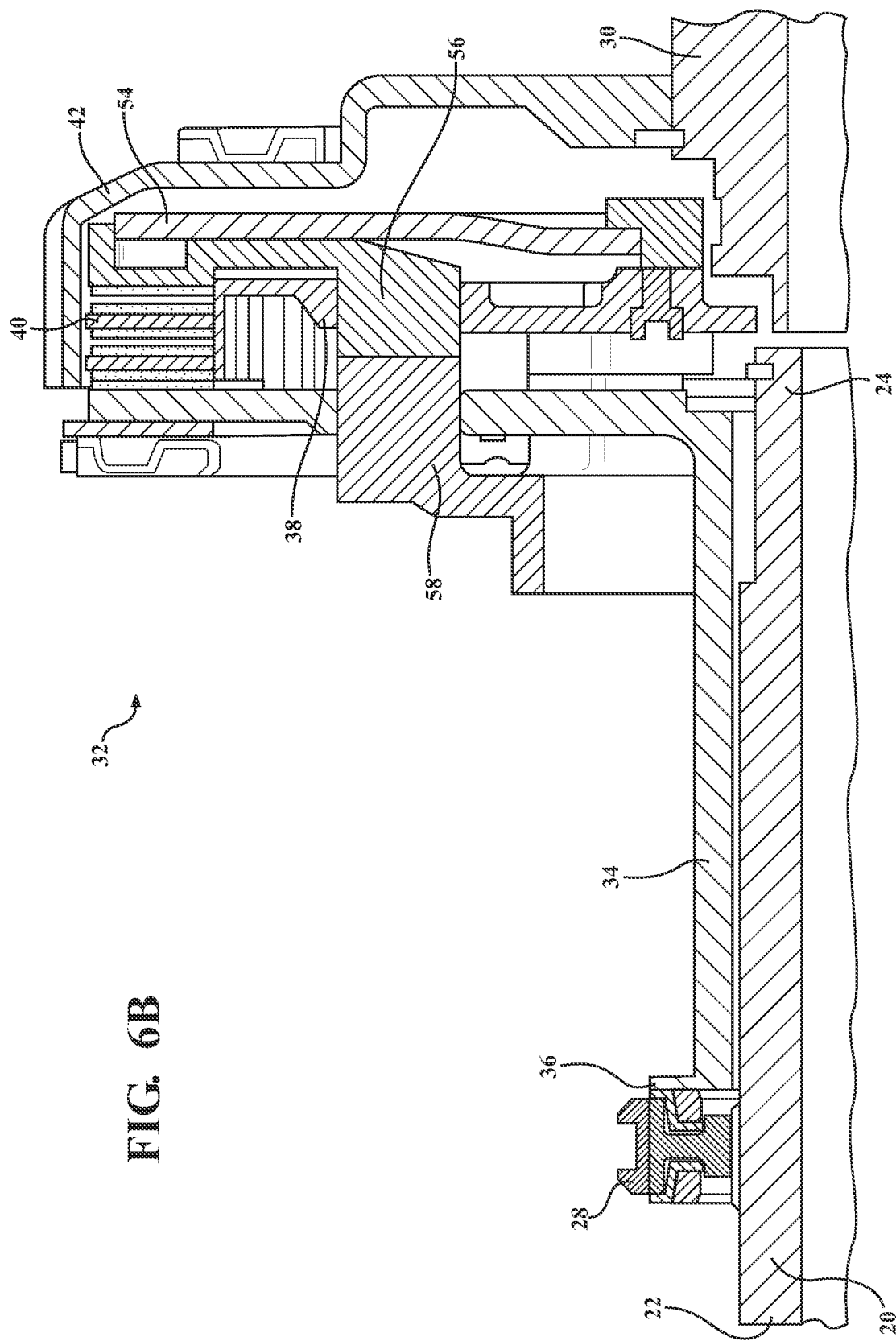
FIG. 6B is a cross-section view of the shifting assembly, with the disconnect being a synchronizer, and with the disconnect in the first disconnect position where the disconnect is disengaged with the input hub, and the apply plate is in the second plate position where the plurality of clutch plates are in the disengaged position.
Figure 6C:
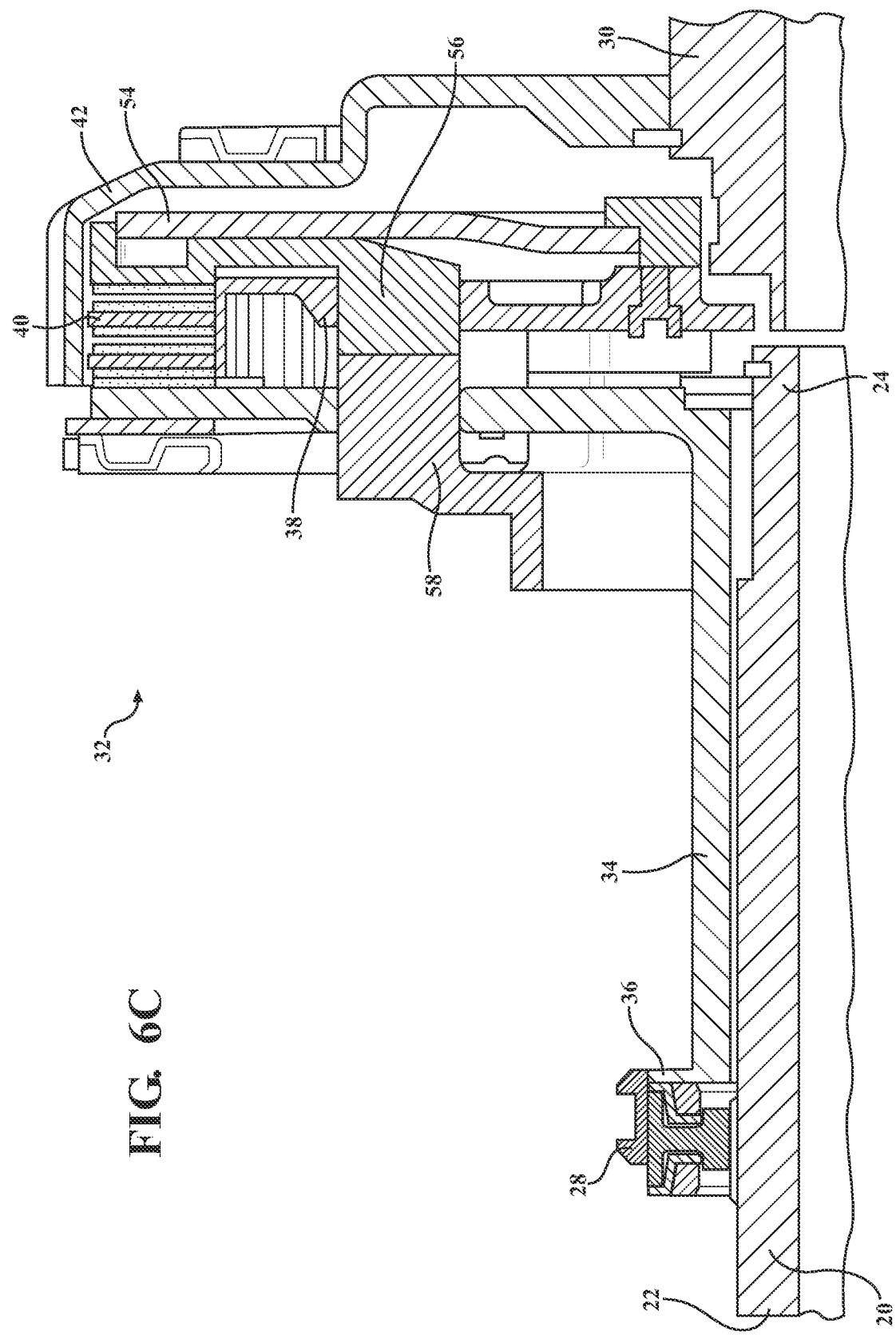
FIG. 6C is a cross-sectional view of the shifting assembly, with the disconnect being a synchronizer, and with the disconnect in the second disconnect position where the disconnect is engaged with the input hub, and the apply plate is in the second plate position where the plurality of clutch plates are in the disengaged position.
Figure 6D:
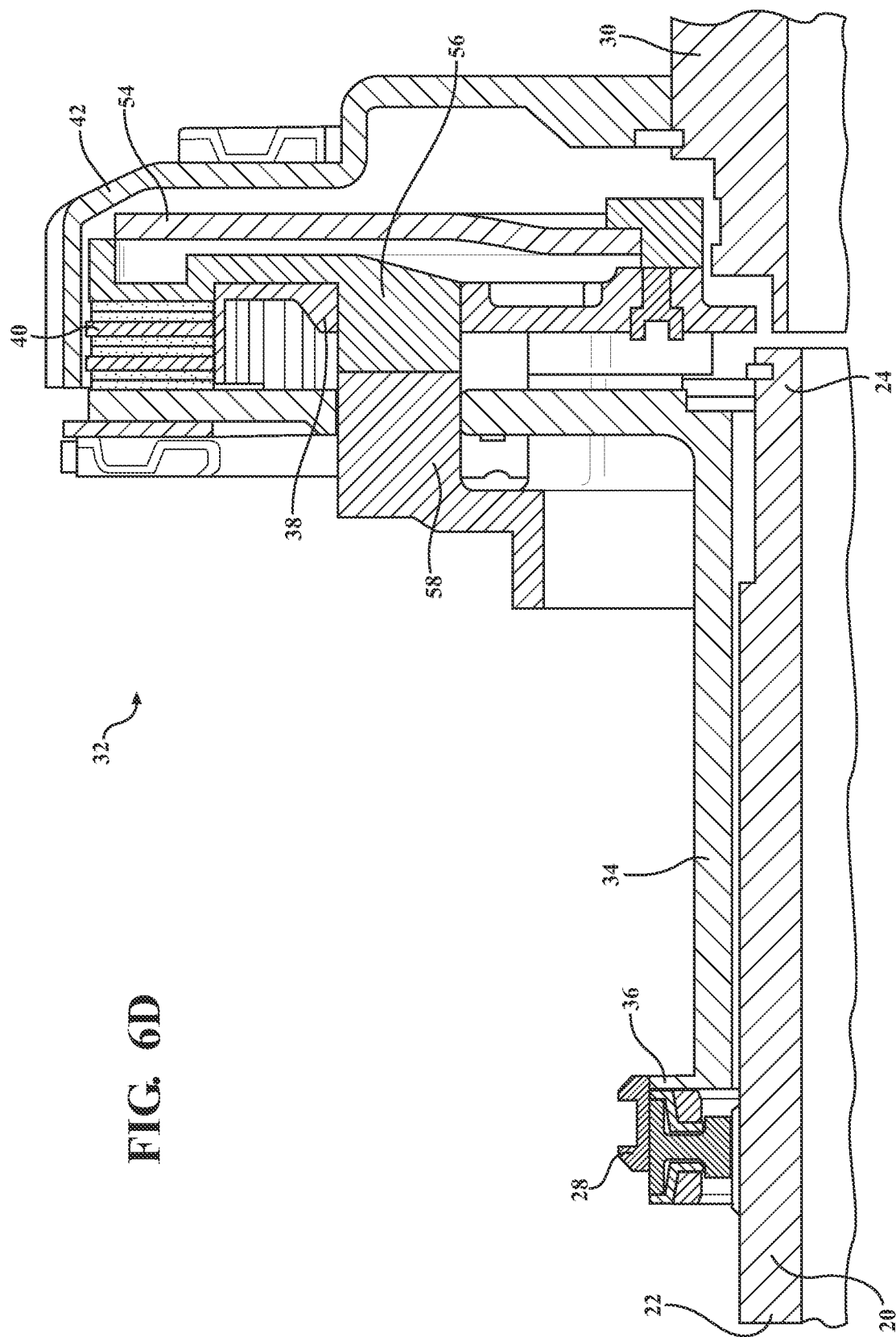
FIG. 6D is a cross-sectional view of the shifting assembly, with the disconnect being a synchronizer, and with the disconnect in the second disconnect position where the disconnect is engaged with the input hub, and the apply plate is in the first disconnect position where the plurality of clutch plates are in the engaged position.
Figure 7A:
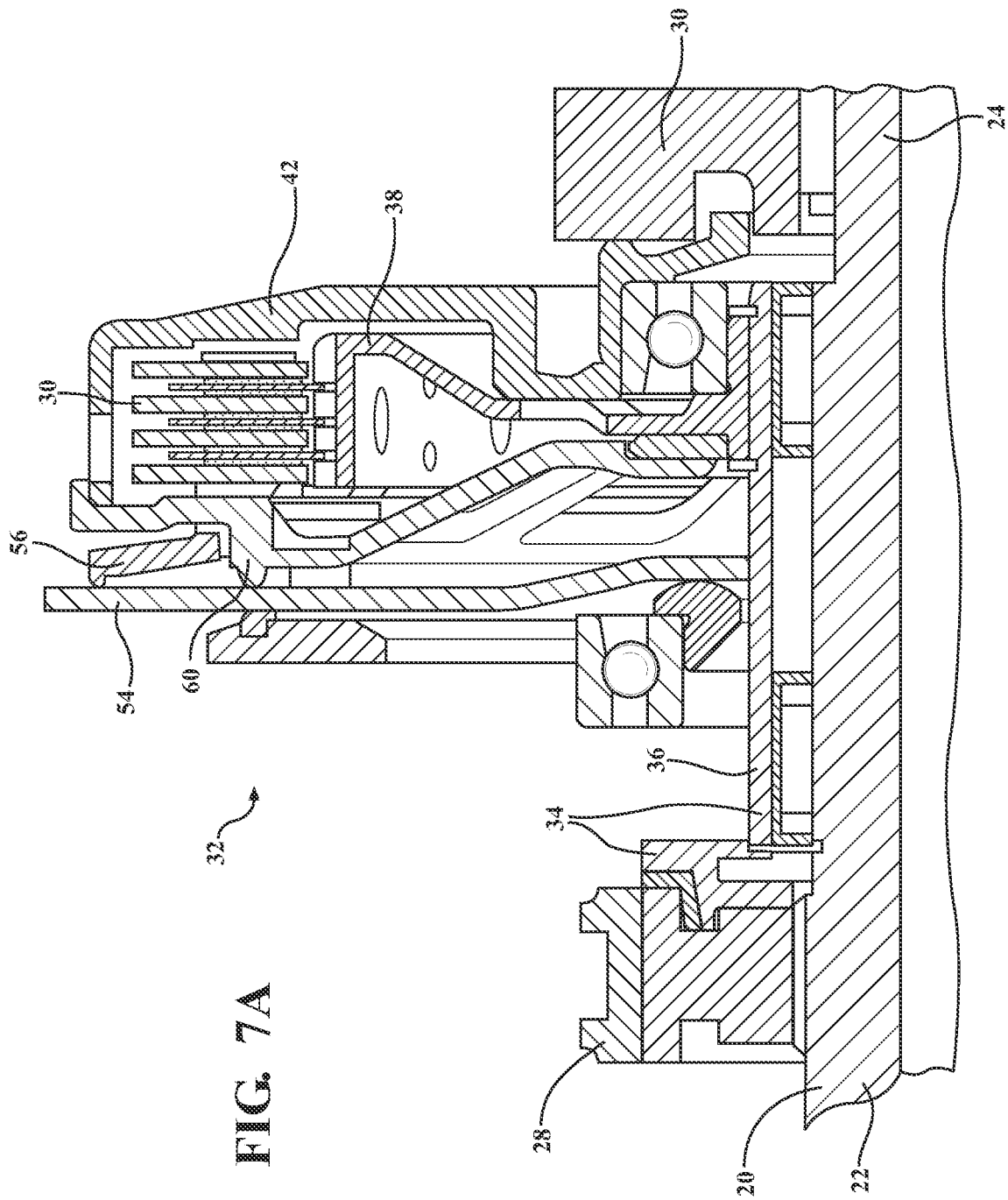
FIG. 7A is a cross-section view of the shifting assembly, with the disconnect in the first disconnect position where the disconnect is disengaged with the input hub, and the apply plate is in the first plate position where the plurality of clutch plates are in the engaged position.
Figure 7B:
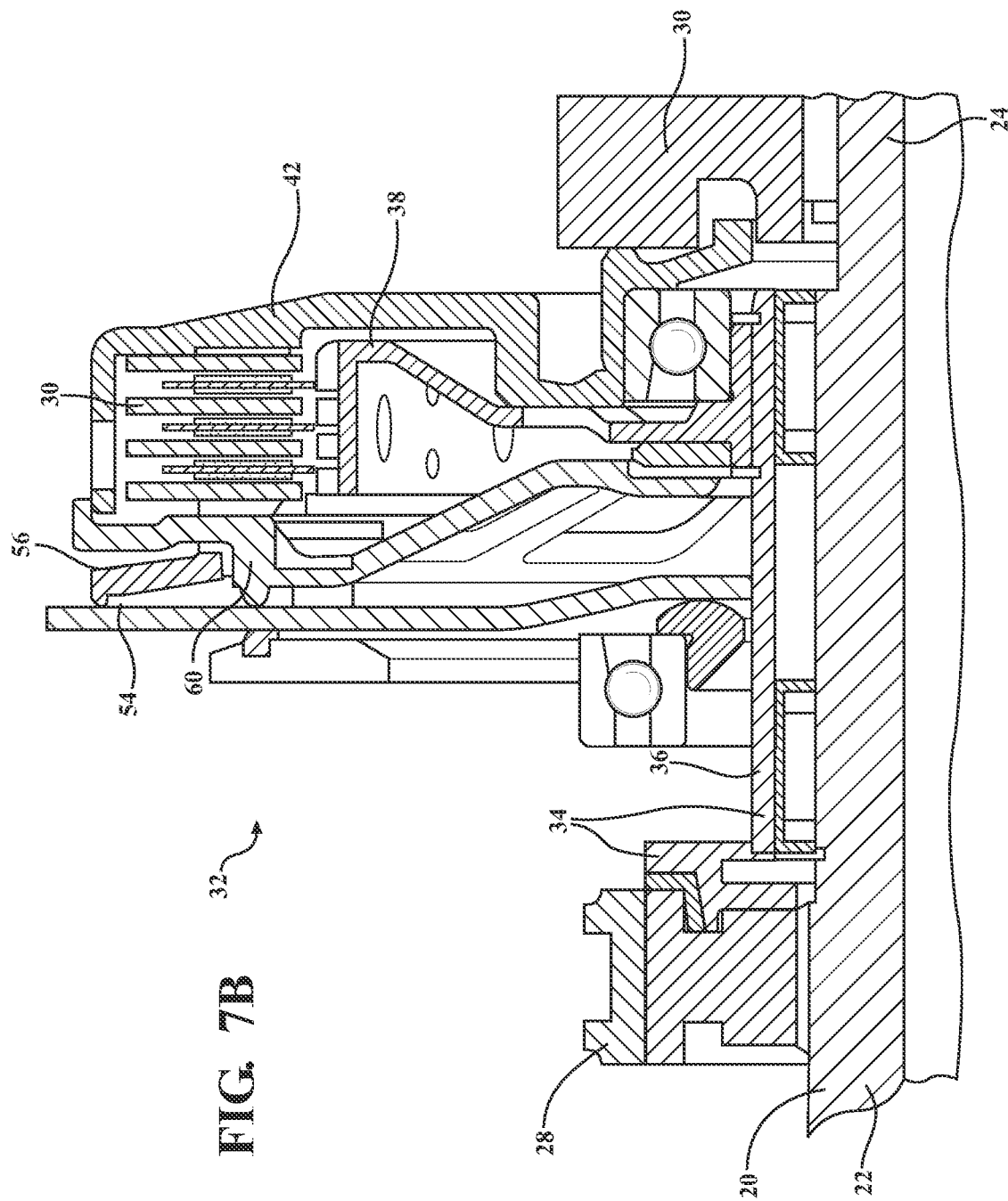
FIG. 7B is a cross-section view of the shifting assembly, with the disconnect in the first disconnect position where the disconnect is disengaged with the input hub, and the apply plate is in the second plate position where the plurality of clutch plates are in the disengaged position.
Figure 7D:
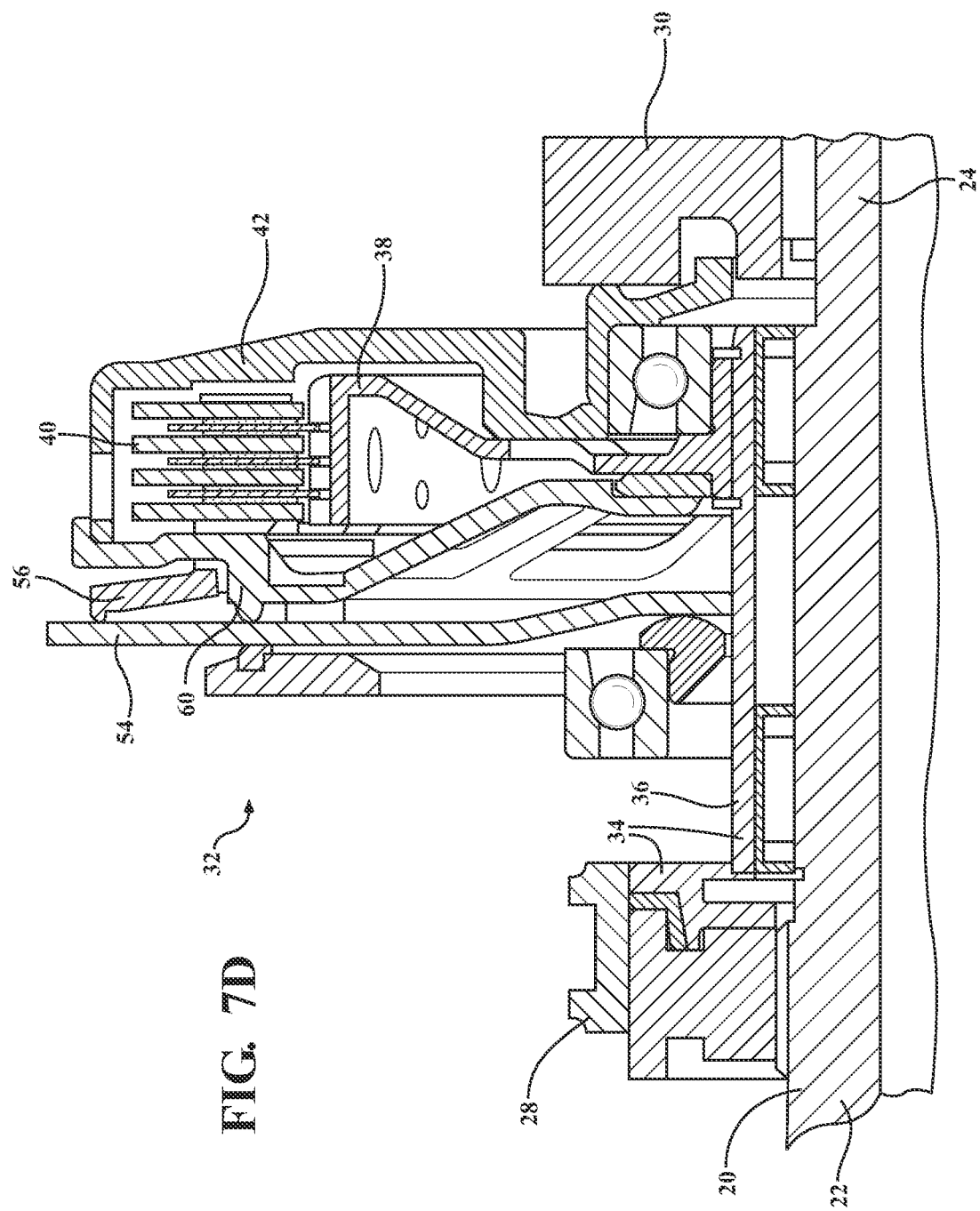
FIG. 7D is a cross-sectional view of the shifting assembly, with the disconnect in the second disconnect position where the disconnect is engaged with the input hub, and the apply plate is in the first disconnect position where the plurality of clutch plates are in the engaged position.

The selectable one-way clutch 26 may have an inner race 44 and an outer race 46 disposed about the inner race 44, as shown in FIGS. 4A-4C. In other words, the inner race 44 and the outer race 46 may be concentric with one another. In one embodiment, as shown in FIGS. 1A and 1B, the inner and outer races 44, 46 of the selectable one-way clutch 26 may be disposed about and aligned axially with the input member 20. The inner race 44 of the selectable one-way clutch 26 may be rotatably coupled with the input member 20. The inner race 44, in a non-limiting example, may be splined to the input member 20 such that rotation of the input member 20 results in rotation of the inner race 44 of the selectable one-way clutch 26. Additionally, or alternatively, the inner race 44 of the selectable one-way clutch 26 may be bolted to, or otherwise mechanically fastened to, the input member 20.

The selectable one-way clutch 26 may also have at least one pawl 48 disposed between the inner race 44 and the outer race 46. The pawl 48 selectively rotatably couples the inner race 44 and the outer race 46. In a non-limiting example, the pawl 48 may be rotatable to engage both the inner race 44 and the outer race 46 to prevent relative rotation between the inner race 44 and the outer race 46. It is to be appreciated that the pawl 48 may allow rotational coupling between the inner race 44 and the outer race 46 in the first rotational direction D1 while preventing rotational coupling between the inner race 44 and the outer race 46 in the second rotational direction D2. Alternatively, it is to be appreciated that the pawl 48 may allow rotational coupling between the inner race 44 and the outer race 46 in the second rotational direction D2 while preventing rotational coupling between the inner race 44 and the outer race 46 in the first rotational direction D1. The pawl 48 may also either prevent, or allow, rotational coupling between the inner race 44 and the outer race 46 in both the first rotational direction D1 and the second rotational direction D2.

The at least one pawl 48 may be further defined as a plurality of pawls 50 circumferentially spaced from one another. The selectable one-way clutch 26 may further include an actuator ring 52 coupled to the plurality of pawls 50 for selectively rotatably locking the inner and outer races 44, 46 together. The actuator ring 52 may be in physical contact with the pawls 50 such that movement, for example rotation, of the actuator ring 52 results in movement, for example rotation, of the pawls 50. The actuator ring 52 may be electrically actuated by a small electric motor or solenoid. The small electric motor or solenoid may be coupled to the outer race 46 of the selectable one-way clutch 26. It is also to be appreciated that the actuator ring 52 may be hydraulically, pneumatically, or otherwise actuated.

The shifting assembly 32 may further include a biasing member 54 coupled to the plurality of clutch plates 40 to bias the plurality of clutch plates 40 toward the engaged position ENG. In other words, the plurality of clutch plates 40 may be normally closed and at rest in the engaged position ENG. Because the plurality of clutch plates 40 of the shifting assembly 32 at rest are in the engaged position ENG due to the biasing member 54 biasing the plurality of clutch plates 40 toward the engaged position ENG, the shifting assembly 32 is energy efficient, and thus the shifting system 18 is also energy efficient. Said differently, because power from an electronic actuator or a hydraulic actuator is not needed to maintain the plurality of clutch plates 40 in the engaged position ENG, the shifting assembly 32 is energy efficient, and thus the shifting system 18 is energy efficient.

The shifting assembly 32 may further include an apply plate 56 coupled to the biasing member 54. The apply plate 56 is movable between a first plate position where the plurality of clutch plates 40 are in the engaged position ENG, and a second plate position where the apply plate 56 is engaged with the biasing member 54 and the plurality of clutch plates 40 are in the disengaged position D-ENG.

In one embodiment, the apply plate 56 and the disconnect 28 are movable independent of one another. The apply plate 56 may be moved from the first plate position to the second plate position, resulting in the plurality of clutch plates 40 moving from the engaged position ENG to the disengaged position D-ENG, independent of whether the disconnect 28 is in the first disconnect position DP1 or the second disconnect position DP2 and without affecting the position of the disconnect 28. Likewise, the disconnect 28 may be moved from the first disconnect position DP1 to the second disconnect position DP2, resulting in the input hub 34 being engaged, independent of whether the apply plate 56 is in the first plate position or the second plate position and without affecting the position of the apply plate 56.

In the embodiment where the apply plate 56 and the disconnect 28 are movable independent of one another, the shifting system 18 may also include a first actuator coupled to the disconnect 28 to move the disconnect 28 from the first disconnect position DP1 to the second disconnect position DP2 independent of the apply plate 56, and a second actuator coupled to the apply plate 56 to move the apply plate 56 from the first plate position to the second plate position independent of the disconnect 28. It is to be appreciated that the first and second actuators may be moved through, but not limited to, mechanical actuation, electrical actuation, hydraulic actuation, or pneumatic actuation.

In some embodiments, the input member 20 is rotatably coupled to the output member 30 when the disconnect 28 is in the second disconnect position DP2 and the apply plate 56 is in the first plate position. In other words, the input member 20 may be rotatably coupled to the output member 30 when the apply plate 56 is in the first plate position where the biasing member 54 is able to bias the plurality of clutch plates 40 toward the engaged position ENG, and when the disconnect 28 is in the second disconnect position DP2 where the disconnect 28 is engaged with the input hub 34. In these positions, torque is able to be transmitted from the input member 20, through the input hub 34, the plurality of clutch plates 40, and the clutch plate carrier 42 to the output member 30.

In some embodiments, the input member 20 is rotatably decoupled from the output member 30 when the disconnect 28 is in the first disconnect position DP1 and/or when the apply plate 56 is in the second plate position. In other words, the input member 20 is rotatably decoupled from the output member 30 when either the disconnect 28 is in the first disconnect position DP1, the apply plate 56 is in the second plate position, or both the disconnect 28 is in the first disconnect position DP1 and the apply plate 56 is in the second plate position. In these positions, torque is unable to be transferred from the input member 20 to the output member 30.

The disconnect 28 and the plurality of clutch plates 40 are disposed in series with one another in the embodiments where the input member 20 is rotatably coupled to the output member 30 only when the disconnect 28 is in the second disconnect position DP2 and the apply plate 56 is in the first plate position. Said differently, if either the disconnect 28 is in the first disconnect position DP1 where the disconnect 28 is disengaged from the input hub 34, or the apply plate 56 is in the second plate position where the plurality of clutch plates 40 are disengaged, then the input member 20 is rotatably decoupled from the output member 30. Therefore, when disposed in series, both the disconnect 28 must be engaged with the input hub 34 and the plurality of clutch plates 40 must be engaged with one another to transfer torque directly from the input member 20 to the output member 30.

The disconnectable component 36 of the input hub 34 and the clutch engagement component 42 of the input hub 34 may be integral with one another. Alternatively, the disconnectable component 36 of the input hub 34 and the clutch engagement component 42 of the input hub 34 may be separate components. In some embodiments, the clutch engagement component 42 of the input hub 34 may be rotatably connected to the disconnectable component 36 of the input hub 34 through use of keys, tabs, or bolts. It is to be appreciated that the input hub 34 may be more than two components, and may include a third component or more to transmit torque from the input member 20 to the plurality of clutch plates 40.

In some embodiments, as shown in FIGS. 5A-6D, the shifting assembly 32 further includes an intermediate apply plate 58 coupled to the apply plate 56 such that the apply plate 56 is disposed between the intermediate apply plate 58 and the biasing member 54. The apply plate 56 is contactable by the intermediate apply plate 58 in the first plate position to engage the plurality of clutch plates 40. In this embodiment, the intermediate apply plate 58 transmits force to the apply plate 56, and thus to the biasing member 54, to move the biasing member 54 and result in the plurality of clutch plates 40 being in the disengaged position D-ENG. It is to be appreciated that the intermediate apply plate 58 may also be commonly referred to as a release plate.

Although not required, the shifting assembly 32 may also include a support ring 60 disposed between the biasing member 54 and the clutch engagement component 42 to support the plurality of clutch plates 40. The support ring 60 may be disposed about the axis A, and may be rotatable with either the input member 20 or the output member 30. The support ring 60 may be spaced from the plurality of clutch plates 40 along the axis A, as shown in FIGS. 7A-7D, and may be rotatably coupled to the clutch plate carrier 42.

In some embodiments, as shown in FIGS. 7A-7D, the biasing member 54 is spaced from the clutch engagement component 42 of the input hub 34 and the clutch plate carrier 42 along the axis A such that the clutch engagement component 42 of the input hub 34 is disposed between the biasing member 54 and the clutch plate carrier 42. In this embodiment, the support ring 60 is disposed between the biasing member 54 and the plurality of clutch plates 40, is disposed between the biasing member 54 and the clutch engagement component 42 of the input hub 34.

In other embodiments, as shown in FIGS. 7A-7D, the clutch engagement component 42 of the input hub 34 is spaced from the biasing member 54 and the clutch plate carrier 42 along the axis A such that the biasing member 54 is disposed between the clutch engagement component 42 of the input hub 34 and the clutch plate carrier 42. In this embodiment, the support ring 60 is disposed between the biasing member 54 and the clutch engagement component 42.

In some embodiments, the biasing member 54 is a Belleville spring. It is to be appreciated, however, that the biasing member 54 may be any type of spring, including, but not limited to, a wave spring, a coil spring, and a conical spring.

As shown in FIGS. 5A-6D, the output member 30 may be spaced from the input member 20 along the axis A. In the embodiments where the output member 30 is spaced from the input member 20 along the axis A, the input member 20 may be a shaft, and the output member 30 may also be a shaft. In this embodiment, the output member 30 may be the sole output of the shifting system 18.

It is to be appreciated that in the embodiments illustrated in FIGS. 5A-6D, the apply plate 56 may translate along the axis from the first plate position to the second plate position to translate the biasing member 54 along the axis. In doing so, the plurality of clutch plates 40 is moved from the engaged position ENG to the disengaged position D-ENG.

As shown in FIGS. 7A-7D, the output member 30 may be radially spaced from and disposed about the input member 20. In the embodiments where the output member 30 is radially spaced from and disposed about the input member 20, the output member 30 may be one of at least two outputs of the shifting system 18. Another output other than the output member 30 itself may be the input member 20. Said differently, if the disconnect 28 is in the first disconnect position DP1 or the apply plate 56 is in the second plate position, the input member 20 may still be able to transfer torque. It is to be appreciated that the output member 30 may be a gear in the embodiments where the output member 30 is radially spaced from and disposed about the input member 20.

It is to be appreciated that in the embodiments illustrated in FIGS. 7A-7D, the biasing member 54 may pivot about a pivot point of the biasing member 54 when a section of the apply plate 56 closest to the input member 20 is translated along the axis A. In doing so, a section of the apply plate 56 furthest from the input member 20 is moved away from the plurality of clutch plates 40, and the plurality of clutch plates 40 is moved from the engaged position ENG to the disengaged position D-ENG. It is to be appreciated that the pivot point at which the biasing member 54 may pivot is shown where the support ring 60 and an additional backing plate both contact the biasing member 54. The areas of contact of the support ring 60 and additional backing plate where the support ring 60 and/or the additional backing plate contact the biasing member 54 may be hardened against wear.

In some embodiments, the selectable one-way clutch 26 is further movable to a fourth position, as shown in FIG. 3, where the selectable one-way clutch 26 is configured to allow torque to be transmitted through one of the first and second gear ratios 14, 16 of the gearset 12 from the input member 20 in the second rotational direction D1 and prevent torque from being transmitted through one of the first and second gear ratios 14, 16 of the gearset 12 from the input member 20 in the first rotational direction D1. The selectable one-way clutch 26, in these embodiments, is typically referred to as a four-mode clutch. It is also to be appreciated that the selectable one-way clutch 26 may also be referred to as a multi-mode clutch module. An example of a multi-mode clutch module is described in U.S. Pat. No. 9,151,345 (filed on Jun. 2, 2014 and issued on Oct. 6, 2015) and U.S. Pat. No. 9,726,236 (filed on Jan. 27, 2014 and issued on Aug. 8, 2017), the disclosures of which are both incorporated by reference in their entirety.

In the embodiments where the selectable one-way clutch 26 is movable to a fourth clutch position (denoted as O/X in FIG. 3), the shifting system 18 may allow regeneration of the electric motor. More specifically, the shifting system 18 may allow regenerative braking. Torque may be transferred from one of the first and second gear ratios 14, 16 through the selectable one-way clutch 26 in the fourth clutch position O/X, and/or the shifting assembly, to the electric motor. In this instance, the electric motor may be a generator which converts rotational movement of the input member 20 to electrical energy.

The vehicle transmission may also include a countershaft 62 spaced from the input member 20 and rotatable about a countershaft axis CA. It is to be appreciated that the countershaft 62 may also be referred to as a layshaft 62. The clutch 26 may be configured to transmit torque from the input member 20 to the countershaft 62 through the first gear ratio 14. The shifting assembly 32 may be configured to transmit torque from the output member 30 to the countershaft 62 through the second gear ratio 16. It is to be appreciated that the output member 30 may be a shaft, a gear, or even the countershaft 62 itself.

It is to be appreciated that the inner and outer races 44, 46 of the selectable one-way clutch 26 may be disposed about and aligned axially with the input member 20, as shown in FIGS. 1A and 1B. It is also to be appreciated that, in the embodiments where the inner and outer races 44, 46 of the selectable one-way clutch 26 is disposed about and aligned axially with the input member 20, the shifting assembly 32 may either be coupled to the input member 20, as shown in FIG. 1A, or coupled to the countershaft 62, as shown in FIG. 1B.

In another embodiment, as shown in FIGS. 2A and 2B, the inner and outer races 44, 46 of the selectable one-way clutch 26 are disposed about and aligned axially with the countershaft 62. In this embodiment, the input member 20 extends directly from the motor to the shifting assembly 32. However, it is to be appreciated that the input member 20 may be solid, unitary, and one-piece in either, or both, embodiments where the selectable one-way clutch 26 is disposed about and aligned axially with either the input member 20 or the countershaft 62. It is also to be appreciated that, in the embodiments where the inner and outer races 44, 46 of the selectable one-way clutch 26 is disposed about and aligned axially with the countershaft 62, the shifting assembly 32 may either be coupled to the input member 20, as shown in FIG. 2A, or coupled to the countershaft 62, as shown in FIG. 2B.

A method 100 of operating the shifting system 18 is also provided. The method 100 includes the step 102 of moving the selectable one-way clutch 26 from the first clutch position X/X where the selectable one-way clutch 26 is configured to allow torque to be transmitted through one of the first and second gear ratios 14, 16 from the input member 20 in either the first rotational direction D1 or the second rotational direction D2 opposite the first rotational direction, to the second clutch position X/O where the selectable one-way clutch 26 is configured to allow torque to be transmitted through one of the first and second gear ratios 14, 16 from the input member 20 in the first rotational direction D1 and prevent torque from being transmitted through one of the first and second gear ratios 14, 16 from the input member 20 in the second rotational direction D2. The step 102 of moving the selectable one-way clutch 26 from the first clutch position X/X to the second clutch position X/O is indicated by a shifting schedule in FIG. 3, particularly by elements A and B.

The method 100 also includes the step 104 of moving the plurality of clutch plates 40 from the engaged position ENG, where the clutch plates 40 are engaged with one another, to the disengaged position D-ENG, where the clutch plates 40 are disengaged from one another. The step 104 of moving the clutch plates 40 from the engaged position ENG to the disengaged position D-ENG is indicated by the shifting schedule in FIG. 3, particularly by element C.

The method 100 further includes the step 106 of moving the disconnect 28 from the first disconnect position DP1, where the disconnectable component 36 of the input hub 34 is disengaged from the disconnect 28, to the second disconnect position DP2, where the disconnectable component 36 of the input hub 34 is engaged with the disconnect 28. The step 106 of moving the disconnect 28 from the first disconnect position DP1 to the second disconnect position DP2 is indicated by the shifting schedule in FIG. 3, particularly by element D.

The method 100 further includes the step 108 of moving the selectable one-way clutch 26 from the second clutch position X/O, to the third clutch position O/O where the selectable one-way clutch 26 is configured to prevent torque from being transmitted through one of the first and second gear ratios 14, 16 from the input member 20 in either the first rotational direction D1 or the second rotational direction D2 to shift the transmittance of torque from the input member 20 through one of the first and second gear ratios 14, 16, to from the input member 20 through the other of the first and second gear ratios 14, 16. The step 108 of moving the selectable one-way clutch 26 from the second clutch position X/O to the third clutch position O/O is indicated by the shifting schedule in FIG. 3, particularly by element F.

In one embodiment, the step 102 of moving the selectable one-way clutch 26 from the first clutch position X/X to the second clutch position X/O precedes the step 104 of moving the plurality of clutch plates 40 from the engaged position ENG to the disengaged position D-ENG. Additionally, the step 104 of moving the plurality of clutch plates 40 from the engaged position ENG to the disengaged position D-ENG may precede the step 106 of moving the disconnect 28 from the first disconnect position DP1 to the second disconnect position DP2. In this way, the disconnect 28 may smoothly engage the disconnectable component 36 of the input hub 34 because the clutch plates 40 in the disengaged position D-ENG rotatably decouple the input member 20 from the output member 30.

Moreover, the step 106 of moving the disconnect 28 from the first disconnect position DP1 to the second disconnect position DP2 may precede the step 108 of moving the selectable one-way clutch 26 from the second clutch position X/O to the third clutch position O/O. The method 100 may further include the step 110 of moving the plurality of clutch plates 40 from the disengaged position D-ENG to the engaged position ENG, as indicated by the shifting schedule in FIG. 3, particularly by element E. In other words, the clutch plates 40 may be re-engaged. In the embodiments where the clutch plates 40 are normally closed, the step 110 of moving the clutch plates 40 from the disengaged position D-ENG to the engaged position ENG results in the clutch plates 40 being at rest and torque being able to be transmitted through the shifting assembly 32 to the other of the first and second gear ratios 14, 16. In this way, torque is allowed to be transmitted through the shifting assembly 32 to the other of the first and second gear ratios 14, 16. As discussed above in step 108, the selectable one-way clutch 26 may then move from the second clutch position X/O to the third clutch position O/O to rotatably decouple the input member 20 from the selectable one-way clutch 26 and prevent torque from being transmitted through one of the first and second gear ratios 14, 16.

The step 106 of moving the disconnect 28 from the first disconnect position DP1 to the second disconnect position DP2 may precede the step 110 of moving the plurality of clutch plates 40 from the disengaged position D-ENG to the engaged position ENG. In other words, the disconnect 28 may be engaged with the disconnectable component 36 of the input hub 34 before the clutch plates 40 are re-engaged. Re-engaging the clutch plates 40 after the disconnect 28 is in the second disconnect position DP2 smoothly rotatably couples the input member 20 and the output member 30, thus allowing torque to be transmitted through the other of the first and second gear ratios 14, 16. The shift schedule in FIG. 3 indicated that torque is allowed to be transmitted through one of the first and second gear ratios 14, 16 by element A, and that torque is allowed to be transmitted through the other of the first and second gear ratios 14, 16 by element G.

It is to be appreciated that one of the first and second gear ratios 14, 16, may be either the first gear ratio 14 or the second gear ratio 16. It is also to be appreciated that the other of the first and second gear ratios 14, 16 may be either the first gear ratio 14 or the second gear ratio 16. In other words, the selectable one-way clutch 26 may be configured to transmit torque through the first gear ratio 14 or may be configured to transmit torque through the second gear ratio 16. The shifting assembly 32, therefore, may be configured to transmit torque through the corresponding first gear ratio 14 or second gear ratio 16. In the embodiment where the selectable one-way clutch 26 is configured to transmit torque through the first gear ratio 14, the shifting assembly 32 is configured to transmit torque through the second gear ratio 16. Alternatively, in the embodiment where the selectable one-way clutch is configured to transmit torque through the second gear ratio 16, the shifting assembly 32 is configured to transmit torque through the first gear ratio 14. It is also to be appreciated that the torque multiplication, or torque reduction, through the first gear ratio 14 may be higher than, or may be lower than, through the second gear ratio 16.

A method 200 of operating the shifting system 18 for the vehicle transmission 10 includes the step 202 of engaging the clutch 25 to operatively couple one of the first and second gear ratios 14, 16 to the input member 20, as indicated by elements A and B in FIG. 3. The method 200 also includes the step 204 of moving the disconnect 28 from the first disconnect position DP1 where the disconnectable component 36 of the input hub 34 is disengaged from the disconnect 28, to the second disconnect position DP2 where the disconnectable component 36 of the input hub 34 is engaged with the disconnect 28 to operatively couple the other one of the first and second gear ratios 14, 16 to the input member 20 through the shifting assembly 32. The step 204 of moving the disconnect 28 from the first disconnect position DP1 to the second disconnect position DP2 is indicated by element PS in FIG. 3 and is referred to herein as "park-shifting."

The steps 202, 204 of engaging the clutch 25 and moving the disconnect 28 from the first disconnect position DP1 to the second disconnect position DP2 are performed such that the clutch 25 is operatively coupled to one of the first and second gear ratios 14, 16 at the same time that the shifting assembly 32 is operatively coupled to the other one of the first and second gear ratios 14, 16, thus preventing torque from being transmitted through either the first and second gear ratios 14, 16 of the vehicle transmission 10 to park the vehicle. The result of steps 202, 204 of engaging the clutch 25 and moving the disconnect 28 from the first disconnect position DP1 to the second disconnect position DP2 are indicated by element P in FIG. 3 and is referred to herein as "park" or "parked".

The method 200 may also be performed such that torque is prevented from being transmitted from either of the input member 20 or the output member 30 through either the first and second gear ratios 14, 16 when the clutch 25 is operatively coupled to one of the first and second gear ratios 14, 16 at the same time that the shifting assembly 32 is operatively coupled to the other one of the first and second gear ratios 14, 16. Said differently, the method 200 may prevent torque from being transmitted from the input member 20, through either the first and second gear ratios 14, 16, to the output member 30. Moreover, the method 200 may prevent torque from being transmitted from the output member 30, through either of the first and second gear ratios 14, 16, to the input member 20. In this way, the method 200 may rotatably lock the input member 20 and the output member 30 relative to one another.

In one embodiment, the first and second gear ratios 14, 16 are opposing one another. Said differently, transmittance of torque through the first gear ratio 14 prevents transmittance of torque through the second gear ratio 16, and transmittance of torque through the second gear ratio 16 prevents transmittance of torque through the first gear ratio 14. Moreover, there may be no relative motion between the input member 20 and the output member 30 when the clutch 25 is operatively coupled to one of the first and second gear ratios 14, 16 at the same time that the shifting assembly 32 is operatively coupled to the other one of the first and second gear ratios 14, 16.

The method 200 may result in there being no relative motion between the clutch 25 and the shifting assembly 32 when the clutch 25 is operatively coupled to one of the first and second gear ratios 14, 16 at the same time that the shifting assembly 32 is operatively coupled to the other one of the first and second gear ratios 14, 16. In other words, the clutch 25 and the shifting assembly 32 may be static relative to one another throughout the duration of the vehicle being held in park. The clutch 25 is statically held as engaged, and the shifting assembly 32 is statically held such that the clutch plates 40 are in the engaged position and the disconnect 28 is in the second disconnect position DP2.

The clutch 25 may be disposed about the input member 20 and at least partially rotatably coupled to the input member 20, as shown in FIG. 1. In the embodiments where the clutch 25 has the inner race 44 and the outer race 46, particularly in the embodiments where the clutch 25 is the selectable one-way clutch 26, the inner race 44 may be rotatably coupled to the input member 20. The inner race 44 may be splined, bolted, or otherwise mechanically fixed to the input member 20 such that the inner race 44 is rotatably coupled to the input member 20. The outer race 46, however, may be selectively rotatably fixed to the inner race 44 through the pawl 48 or pawls 50.

In the embodiments where the vehicle transmission 10 includes the countershaft 62, the clutch 25 may be disposed about the countershaft 62 and at least partially rotatably coupled to the countershaft 62, as shown in FIG. 2. In the embodiments where the clutch 25 has the inner race 44 and the outer race 46, particularly in the embodiments where the clutch 25 is the selectable one-way clutch 26, the inner race 44 may be rotatably coupled to the countershaft 62. The inner race 44 may be splined, bolted, or otherwise mechanically fixed to the countershaft 62 such that the inner race 44 is rotatably coupled to the countershaft 62. The outer race 46, however, may be selectively rotatably fixed to the inner race 44 through the pawl 48 or pawls 50.

The disconnect 28 may be disposed about and axially aligned with the input member 20. In this embodiment, the shifting assembly 32 may be axially aligned with the input member 20 and the input member 20 may directly transmit torque through the shifting assembly 32 without additional componentry to transmit torque from the input member 20 to the shifting assembly 32. Moreover, the size of the vehicle transmission 10 may be reduced because the disconnect 28 is disposed about and axially aligned with the input member 20.

The plurality of clutch plates 40 may be spaced axially from the disconnect 28 such that the disconnect 28 is disposed between the first gear ratio 14 and the plurality of clutch plates 40. Although not required, the arrangement between the plurality of clutch plates 40, the disconnect 28, and the first gear ratio 14 results in an efficient use of space within the vehicle transmission 10 because the first gear ratio 14 and the disconnect 28 may both be partially disposed about the input member 20, and the plurality of clutch plates 40 may be disposed near one of the first and second ends 22, 24 of the input member 20.

The second gear ratio 16 may be spaced axially from the disconnect 28 such that the disconnect 28 is disposed between the first gear ratio 14 and the second gear ratio 16. Although not required, the arrangement between the disconnect 28, the first gear ratio 14, and the second gear ratio 16 results in the disconnect 28, as a component of the shifting assembly 32, being able to assist in operatively coupling one of the first and second gear ratios 14, 16 at the same time that the clutch 25 is operatively coupled to the other of the first and second gear ratios 14, 16, thus preventing torque from being transmitted through either the first and second gear ratios 14, 16 of the vehicle transmission 10 to park the vehicle.

The method 200 may also include the step 206 of moving the plurality of clutch plates from the disengaged position D-ENG where the clutch plates 40 are disengaged with one another, to the engaged position ENG where the clutch plates 40 are engaged with one another, as indicated by element C in FIG. 3. The step 206 of moving the plurality of clutch plates 40 from the disengaged position D-ENG to the engaged position ENG may precede the step 204 of moving the disconnect 28 from the first disconnect position DP1 to the second disconnect position DP2, as indicated by element PS in FIG. 3. By moving the clutch plates 40 from the disengaged position D-ENG to the engaged position ENG, torque may be transmitted through the shifting assembly 32 when the disconnect 28 is in the second disconnect position DP2. Alternatively, it is to be appreciated that moving the disconnect 28 from the first disconnect position DP1 to the second disconnect position DP2 may precede the step of moving the plurality of clutch plates 40 from the disengaged position D-ENG to the engaged position ENG. By moving the disconnect 28 from the first disconnect position DP1 to the second disconnect position DP2 before the plurality of clutch plates 40 are moved from the disengaged position D-ENG to the engaged position ENG operatively couples the other of the first and second gear ratios 14, 16 through the shifting assembly 32 upon the step 206 of moving the clutch plates 40 from the disengaged position D-ENG to the engaged position ENG being accomplished.

It is to be appreciated that the clutch 25 used in the method 200 may be the selectable one-way clutch 26. However, it is also to be appreciated that the clutch 25 may be any of the clutches disclosed herein, including, but not limited to, another shifting assembly as described herein, a dry friction clutch, a wet friction clutch, a single plate clutch, a multi-plate clutch, a cone clutch, a dog clutch, or a centrifugal clutch.

In the embodiments where the clutch 25 is the selectable one-way clutch 26, the step 202 of engaging the clutch 25 to operatively couple one of the first and second gear ratios 14, 16 to the input member 20 may be further defined as a step 208 of moving the selectable one-way clutch 26 from the third clutch position O/O to the first clutch position X/X, as indicated by elements G-P in FIG. 3. It is to be appreciated that, in the embodiments where the clutch 25 is the selectable one-way clutch 26, the step 202 of engaging the clutch 25 may be further defined as a step 210 moving the selectable one-way clutch 26 from the third clutch position O/O to the second clutch position X/O, and from the second clutch position X/O to the first clutch position X/X. In other words, the selectable one-way clutch 26 may be in the free/free configuration, moved to the lock/free configuration, and then moved to the lock/lock configuration. In the lock/lock configuration, one of the first and second gear ratios 14, 16 are operatively coupled to the selectable one-way clutch 26.

In the embodiments where the clutch 25 is the selectable one-way clutch 26, the step 210 of moving the selectable one-way clutch 26 from the third clutch position O/O to the second clutch position X/O, and from the second clutch position X/O to the first clutch position X/X may precede the step 204 of moving the disconnect 28 from the first disconnect position DP1 to the second disconnect position DP2. In other words, although not required, the selectable one-way clutch 26 may be in the lock/free configuration and moved to the lock/lock position before the disconnect 28 is moved from the first disconnect position DP1 to the second disconnect position DP2. In this embodiment, the selectable one-way clutch 26, therefore, is operably coupled to one of the first and second gear ratios 14, 16 before the shifting assembly 32 is operably coupled to the other of the first and second gear ratios 14, 16. It is to be appreciated, however, that the shifting assembly 32 may be operably coupled to one of the first and second gear ratios 14, 16 before the selectable one-way clutch 26 is operably coupled to the other of the first and second gear ratios 14, 16. To do so, the disconnect 28 may be moved from the first disconnect position DP1 to the second disconnect position DP2 before the selectable one-way clutch 26 is moved from the second clutch position X/O to the first clutch position X/X.

It is to be appreciated that the step 206 of moving the plurality of clutch plates 40 from the disengaged position D-ENG to the engaged position ENG may precede the step 210 of moving the selectable one-way clutch 26 from the third clutch position O/O to the second clutch position X/O, and from the second clutch position X/O to the first clutch position X/X. As discussed above, the plurality of clutch plates 40 may be normally closed and at rest in the engaged position ENG. The disconnect 28, however, may be at rest in either the first disconnect position DP1 or the second disconnect position DP2. Thus, the shifting assembly 32 may be at rest when the disconnect 28 is in the first disconnect position DP1 and the plurality of clutch plates 40 are in the engaged position ENG.

The shifting assembly 32, therefore, may be placed at rest before the selectable one-way clutch 26 is moved from the second clutch position X/O to the first clutch position X/X (i.e., from the lock/free configuration to the lock/lock configuration), thus operably coupling one of the first and second gear ratios 14, 16 to the selectable one-way clutch 26. With the disconnect 28 in the first disconnect position DP1 and the selectable one-way clutch 26 in the first clutch position X/X (i.e., the lock/lock configuration), the vehicle is in either the first or second gear.

The vehicle may be then placed at rest such that the vehicle has no forward or backward movement. The method 200 may then be undertaken, including park-shifting through step 204 by moving the disconnect 28 from the first disconnect position DP1 to the second disconnect position DP2 such that the vehicle results in being parked. The disconnect 28 may be moved from the first disconnect position DP1 to the second disconnect position DP2 without having to move the plurality of clutch plates 40 from the engaged position ENG to the disengaged D-ENG position prior to moving disconnect 28 from the first disconnect position DP1 to the second disconnect position DP2 because the vehicle is at rest.

More specifically, because no torque is being transmitted through the selectable one-way clutch 26 to one of the first and second gear ratios 14, 16, the disconnect 28 may be moved from the first disconnect position DP1 to the second disconnect position DP2 and operably couple the other of the first and second gear ratios 14, 16 through the shifting assembly 32. When both the first and second gear ratios 14, 16 are operably coupled to the selectable one-way clutch 26 and the shifting assembly 32, respectively, the vehicle is parked and movement of the vehicle is prevented because torque cannot be transferred through either of the first and second gear ratios 14, 16, or through both the first and second gear ratios 14, 16. Said differently, the vehicle is prevented from moving when parked because the vehicle cannot be in first gear and second gear at the same time while transmitting torque through either of the first and second gear ratios 14, 16.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A method of operating a shifting system for a vehicle transmission having a gearset comprising first and second gear ratios, with the vehicle transmission disposed in a vehicle, and with the shifting system comprising an input member extending along an axis between a first end and a second end spaced from the first end, with the input member rotatable about the axis, a clutch coupled to the input member and configured to selectively allow torque to be transmitted through one of the first and second gear ratios of the gearset from the input member, a disconnect coupled to the input member, an output member spaced from the input member, the output member selectively rotatable with the input member about the axis to selectively transmit torque through the other of the first and second gear ratios of the gearset; and a shifting assembly to selectively rotatably couple the input member and the output member, the shifting assembly comprising an input hub coupled to the input member, with the input hub having a disconnectable component engageable with the disconnect, and with the input hub having a clutch engagement component, a plurality of clutch plates coupled to the clutch engagement component of the input hub, and a clutch plate carrier coupled to the plurality of clutch plates and to the output member to transmit torque from the clutch engagement component of the input hub through the plurality of clutch plates and the clutch plate carrier to the output member, said method comprising;

engaging the clutch to operatively couple one of the first and second gear ratios to the input member; and moving the disconnect from a first disconnect position where the disconnectable component of the input hub is disengaged from the disconnect, to a second disconnect position where the disconnectable component of the input hub is engaged with the disconnect to operatively couple the other one of the first and second gear ratios to the input member through the shifting assembly;

wherein the steps of engaging the clutch and moving the disconnect from the first disconnect position to the second disconnect position are performed such that the clutch is operatively coupled to one of the first and second gear ratios at the same time that the shifting assembly is operatively coupled to the other one of the first and second gear ratios, thus preventing torque from being transmitted through either the first and second gear ratios of the vehicle transmission to park the vehicle.

2. The method as set forth in claim 1, where torque is prevented from being transmitted from either of the input member or the output member through either the first and second gear ratios when the clutch is operatively coupled to one of the first and second gear ratios at the same time that the shifting assembly is operatively coupled to the other one of the first and second gear ratios.

3. The method as set forth in claim 1, wherein the first and second gear ratios are opposing one another.

4. The method as set forth in claim 1, wherein there is no relative motion between the input member and the output member when the clutch is operatively coupled to one of the first and second gear ratios at the same time that the shifting assembly is operatively coupled to the other one of the first and second gear ratios.

5. The method as set forth in claim 1, wherein there is no relative motion between the clutch and the shifting assembly when the clutch is operatively coupled to one of the first and second gear ratios at the same time that the shifting assembly is operatively coupled to the other one of the first and second gear ratios.

6. The method as set forth in claim 1, wherein the clutch is disposed about the input member and at least partially rotatably coupled to the input member.

7. The method as set forth in claim 1, with the vehicle transmission including a countershaft spaced from the input member and rotatable about a countershaft axis, wherein the clutch is disposed about the countershaft and at least partially rotatably coupled to the countershaft.

8. The method as set forth in claim 1, wherein the disconnect is disposed about and axially aligned with the input member.

9. The method as set forth in claim 1, wherein the plurality of clutch plates is spaced axially from the disconnect such that the disconnect is disposed between the first gear ratio and the plurality of clutch plates.

10. The method as set forth in claim 1, wherein the second gear ratio is spaced axially from the disconnect such that the disconnect is disposed between the first gear ratio and the second gear ratio.

11. The method as set forth in claim 1, wherein the shifting assembly includes a biasing member coupled to the plurality of clutch plates and configured to bias the plurality of clutch plates toward the engaged position.

12. The method as set forth in claim 1 further comprising the step of moving the plurality of clutch plates from a disengaged position where the clutch plates are disengaged with one another, to an engaged position where the clutch plates are engaged with one another.

13. The method as set forth in claim 12, wherein the step of moving the plurality of clutch plates from the disengaged position to the engaged position precedes the step of moving the disconnect from the first disconnect position to the second disconnect position.

14. The method as set forth in claim 12, wherein the step of moving the disconnect from the first disconnect position to the second disconnect position precedes the step of moving the plurality of clutch plates from the disengaged position to the engaged position.

15. The method as set forth in claim 1, wherein the clutch is a selectable one-way clutch moveable between,
 a first clutch position where the selectable one-way clutch is configured to allow torque to be transmitted through one of the first and second gear ratios of the gearset from the input member in either a first rotational direction or a second rotational direction opposite the first rotational direction;
 a second clutch position where the selectable one-way clutch is configured to allow torque to be transmitted through one of the first and second gear ratios of the gearset from the input member in the first rotational direction and prevent torque from being transmitted through one of the first and second gear ratios of the gearset from the input member in the second rotational direction; and
 a third clutch position where the selectable one-way clutch is configured to prevent torque from being transmitted through one of the first and second gear ratios of the gearset from the input member in either the first rotational direction or the second rotational direction.

16. The method as set forth in claim 15, wherein the step of engaging the clutch to operatively couple one of the first and second gear ratios to the input member is further defined as moving the selectable one-way clutch from the third clutch position to the first clutch position.

17. The method as set forth in claim 16, wherein the step of engaging the clutch to operatively couple one of the first and second gear ratios to the input member is further defined as moving the selectable one-way clutch from the third clutch position to the second clutch position, and from the second clutch position to the first clutch position.

18. The method as set forth in claim 17, wherein the step of moving the selectable one-way clutch from the third clutch position to the second clutch position and from the second clutch position to the first clutch position precedes the step of moving the disconnect from the first disconnect position to the second disconnect position.

19. The method as set forth in claim 15, wherein the step of moving the plurality of clutch plates from the disengaged position to the engaged position precedes the step of moving the selectable one-way clutch from the third clutch position to the second clutch position, and from the second clutch position to the first clutch position.

\* \* \* \* \*